(12) United States Patent
Okino

(10) Patent No.: US 6,215,564 B1
(45) Date of Patent: *Apr. 10, 2001

(54) RECORDING MATERIAL AND IMAGE RECORDING METHOD

(75) Inventor: Yoshiharu Okino, Kanagawa (JP)

(73) Assignee: Fuji Photo Film, Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,179

(22) Filed: Dec. 10, 1997

(30) Foreign Application Priority Data

Apr. 11, 1996 (JP) .................................................. 8-089435
Mar. 10, 1997 (JP) .................................................. 9-055253

(51) Int. Cl.[7] ............................................ H04N 1/46
(52) U.S. Cl. ........................................................ 358/501
(58) Field of Search .................................. 358/500, 501, 358/512, 529, 530; 382/162, 163, 167, 169

(56) References Cited

U.S. PATENT DOCUMENTS 5,555,070 * 9/1996 Hermann ............................... 354/412
5,671,072 * 9/1997 Umemoto ............................... 358/501
5,703,701 * 12/1997 Yamamoto ............................ 358/487
5,841,897 * 11/1998 Numakura ............................ 382/163

OTHER PUBLICATIONS

Image Processing Hand Book 2d Ed; John Russ p. 40 ;1994.*

* cited by examiner

*Primary Examiner*—Jerome Grant, II
(74) *Attorney, Agent, or Firm*—Sughrue, Mion, Zinn, Macpeak & Seas, PLLC

(57) ABSTRACT

An image recording method in which an image is exposed onto a negative or positive recording material, and a pattern having a predetermined color and a predetermined density is exposed onto a region of the recording material outside of a region on which the image is exposed. The recording material on which the image and pattern are exposed is developed. Digital image data and digital pattern data are obtained by digitally reading, from the developed recording material, the image and the pattern which have faded and deteriorated over time. Fading correction of the digital image data is carried out on the basis of the color and the density of the pattern based on the obtained digital pattern data, and on the basis of the predetermined color and the predetermined density of the pattern. The image is newly recorded onto another recording material on the basis of the digital image data which has been subjected to fading correction. Accordingly, fading correction processing is suitably performed.

18 Claims, 25 Drawing Sheets

F I G. 1
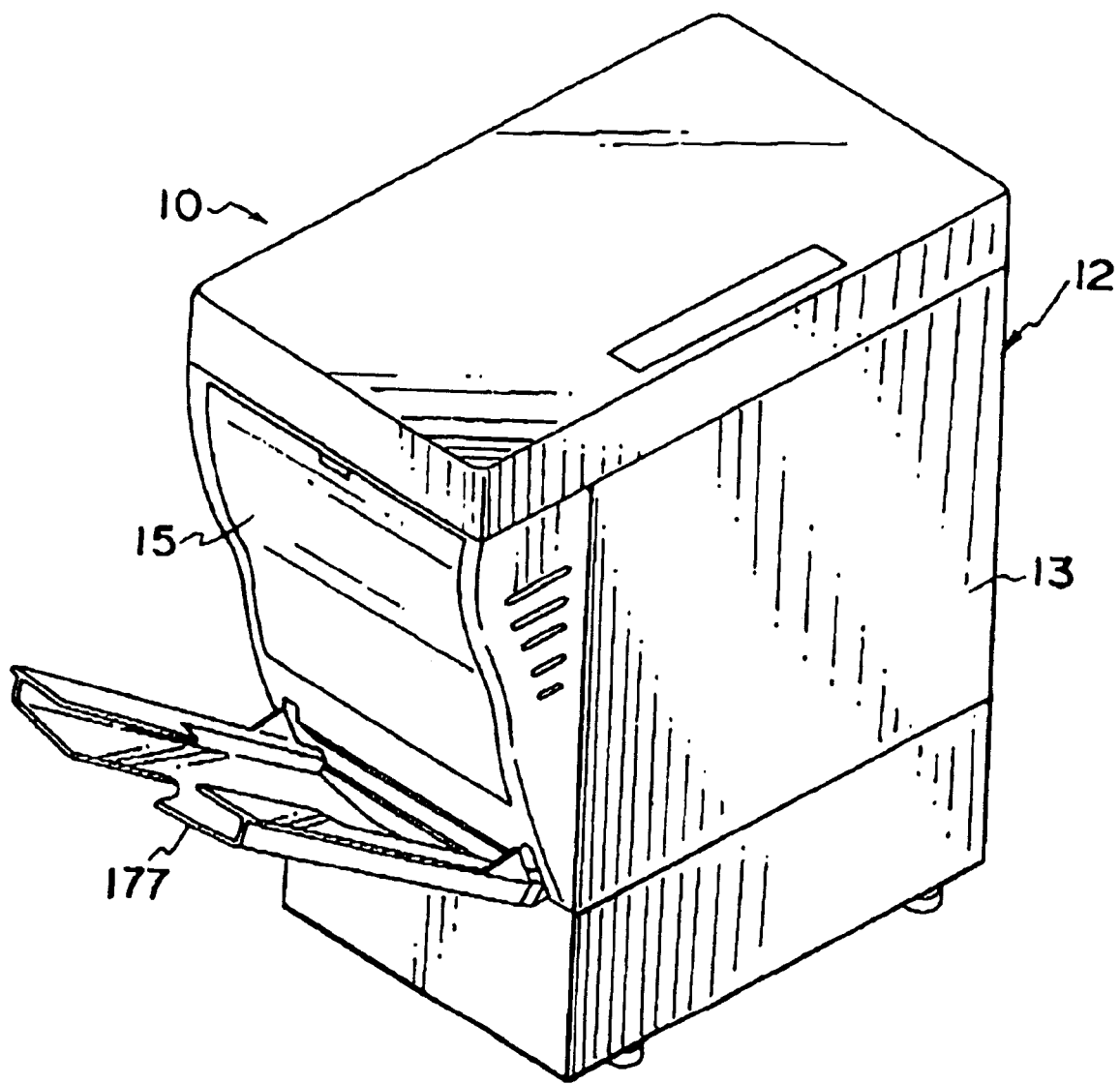

F I G. 8
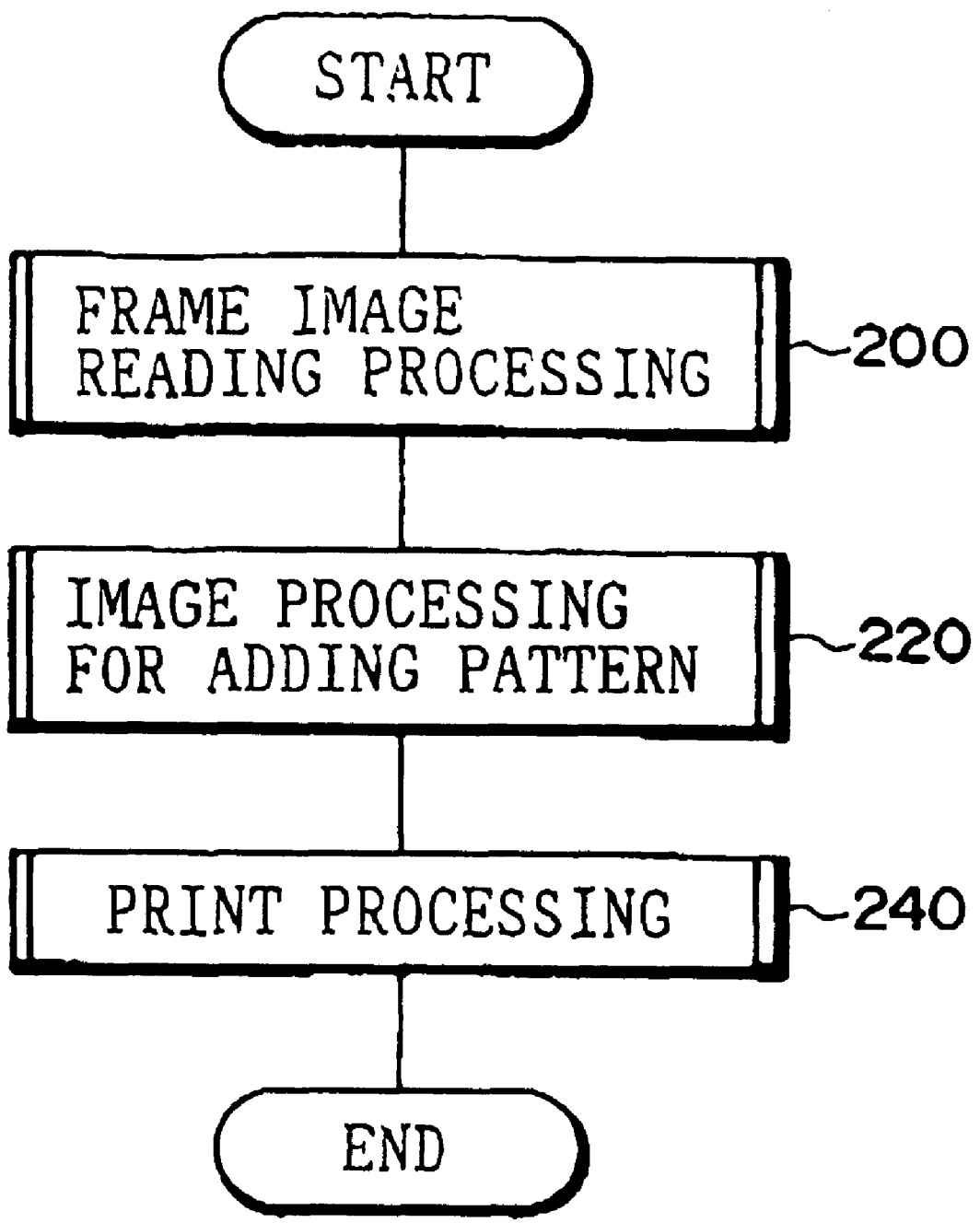

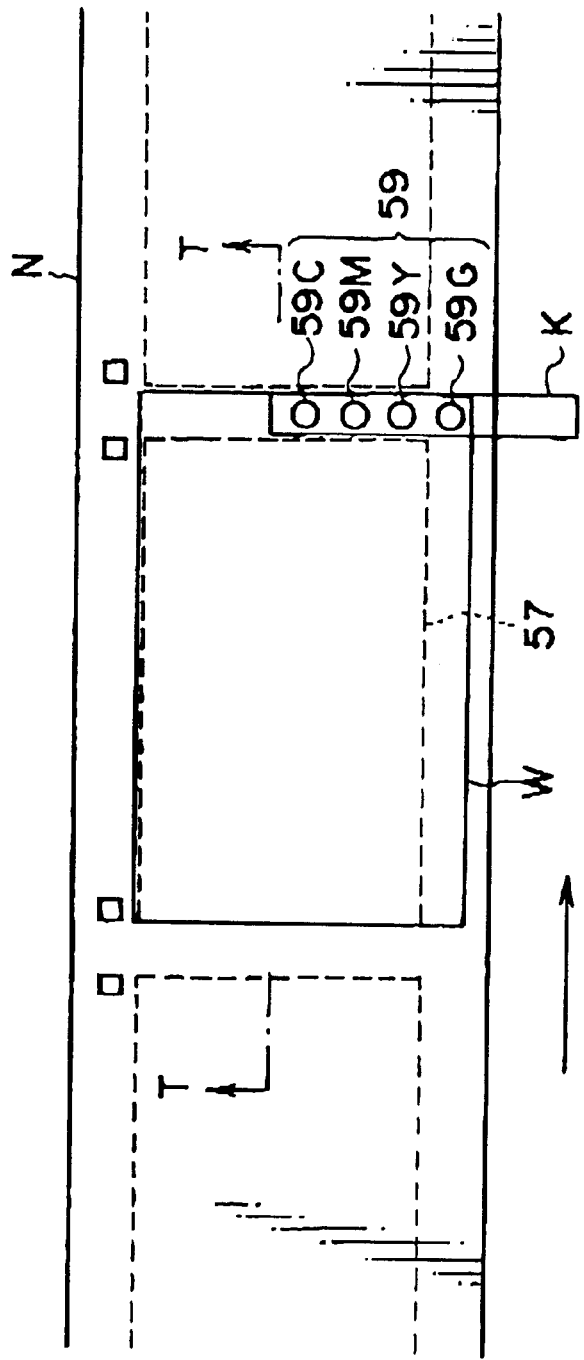
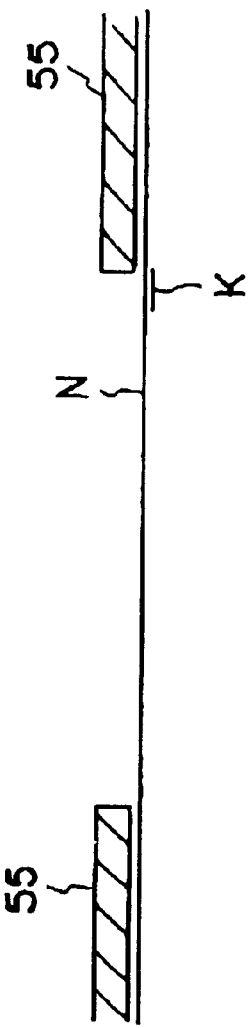

F I G. 2 0
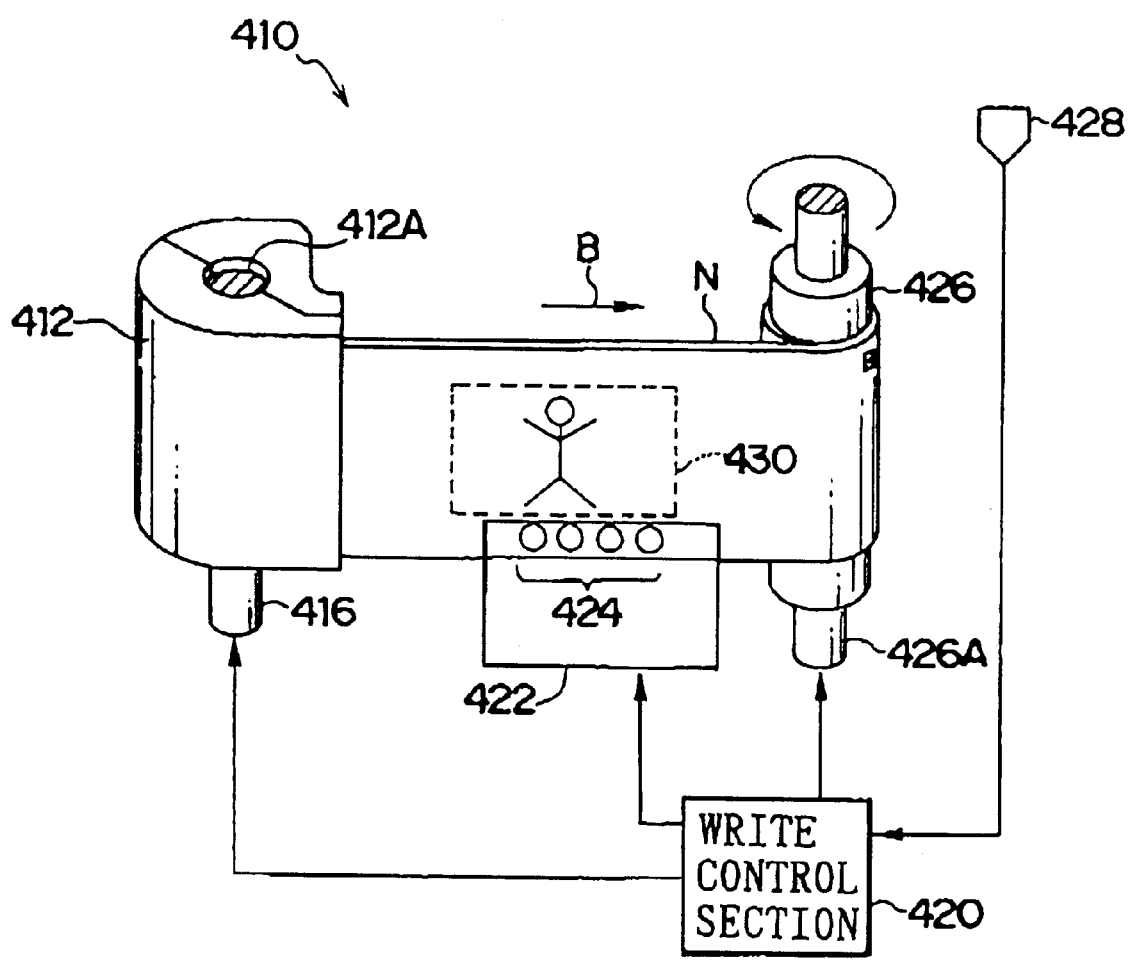

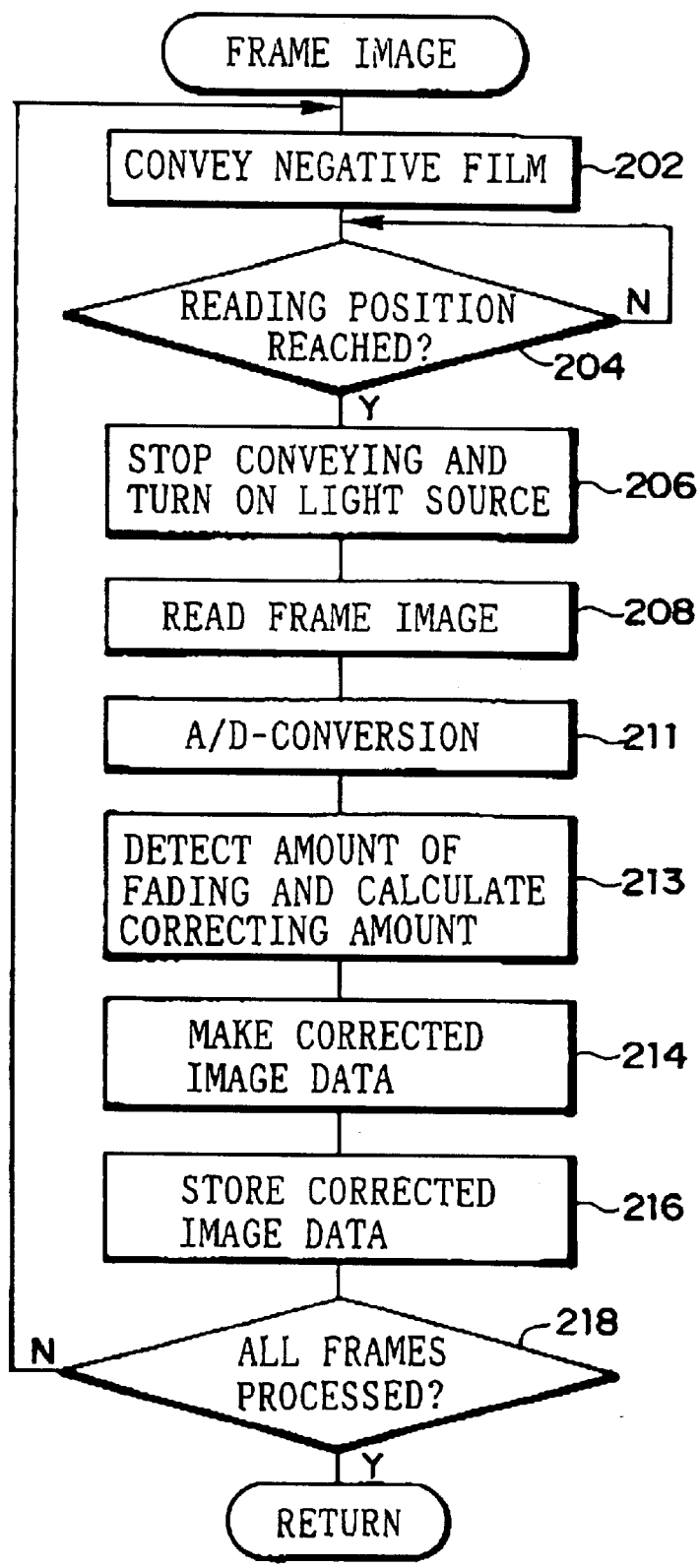

RECORDING MATERIAL AND IMAGE RECORDING METHOD

BACKGROUND OF THE INVENTION

1. Field of the Invention

The present invention relates to a recording material and an image recording method, and more particularly relates to a recording material on which an image is recorded thereto and an image recording method for recording an image onto this recording material.

2. Description of the Related Art

Photographic paper used to make a color print is conventionally coated with three kinds of emulsions, which are blue, green and red sensitive emulsions, in a layers. When a color image recorded on a negative film is printed, yellow, magenta and cyan components of the color image are exposed on the blue, green and red sensitive emulsion layers, respectively. Thus, the color image is formed on the photographic paper by the images exposed on the respective layers.

In a conventional color print, after the exposed photographic paper is subjected to developing processing, the color image fades and saturation of the color image is reduced as time passes so that so-called fading is caused.

Therefore, in a conventional fading correcting method, the image fading is corrected such that, the saturations of three components which are the yellow, magenta and cyan components of the color image are uniformly increased.

However, when fading characteristics of each of three layers which are the blue, green and red sensitive emulsion layers in the above photographic paper are different from one another, the speed at which fading progresses is different for each color component. Therefore, when the color correction is carried out uniformly as in the above method, there is the concern that the color tone balance of the color print will be changed.

Another fading correcting method has been considered in which an operator visually judges the state of the color tone balance of an image and sets a correcting amount for each of the above three color components. The image discoloration is corrected on the basis of the set correcting amounts which are set for respective color components.

However, a high-level judging ability for suitably setting the correcting amount for each of the three color components is required to execute this method so that only an expert operator can execute this method. Further, since a person subjectively makes this judgment, and sets the correcting amounts, and carries out this fading correction, there is the concern that the qualities of the images which have been subjected to fading correction will vary widely in accordance with the persons (operators) carrying out the fading correction.

Fading also occurs over time in a negative or positive film used in photographing as well in photographic papers. Accordingly, it is also important to suitably carry out fading correction processing with respect to films so as to stabilize the quality of the color prints finally made to a constant level.

SUMMARY OF THE INVENTION

To solve the above-mentioned problems, an object of the present invention is to provide a recording material and an image recording method for stabilizing the quality of color prints to a constant level by suitably carrying out fading correction processing of the color prints.

To achieve the above object, a recording material of a first aspect of the present invention is a recording material on which an image is recorded. A pattern having a predetermined color and a predetermined density is recorded on a region of the recording material outside the region on which the image is recorded.

In a second aspect of the present invention, in the first aspect, the predetermined color is cyan, magenta and yellow.

In the recording material of the above first aspect, the pattern having the predetermined color and density is recorded on a region of the recording material outside the image recording region. For example, in a photographic print which is formed by an image being recorded on the recording material by exposure and developing processing or by thermosensitive processing (thermal transfer processing) or the like, when the image fades and deteriorates over time, because the image and the pattern are recorded on the same photograph print, the amount of fading of the pattern can be considered equal.

Accordingly, the color and density of the faded and deteriorated pattern are measured. The amount of fading of the image (e.g., an amount of fading (a saturation correction amount) of each of the three color components of cyan, magenta and yellow and a correction amount of the brightness of the image) can be determined from the measured color and density and the predetermined color and density of the pattern.

Therefore, if the image is corrected to compensate for the amount of fading of the image, the fading of the image can be suitably corrected. Further, since the amount of fading is not judged by the visual sense of a person, no variation in accuracy of the fading correction is caused, and image quality can be stabilized to a constant level.

The above pattern can be formed by using patterns of cyan, magenta and yellow as predetermined colors as in the second aspect.

Namely, the saturation correction amount for correction of each of these colors can be determined by determining the amount of fading of each of the cyan, magenta and yellow patterns. Further, the image brightness correction amount can be determined by determining the amount of fading, i.e., the amount of change in density, of a gray pattern formed by cyan, magenta and yellow.

As an image recording method for recording the above pattern on the recording material, it is possible to adopt the recording method of the third aspect of the present invention in which a pattern having predetermined color and density is additionally recorded onto a region of the recording material outside the image recording region when the image is recorded onto the recording material based on digital image data.

Exposure-developing processing or thermosensitive processing (thermal transfer processing) may be used to additionally record the above pattern.

An image recording method for stabilizing the quality of color prints to a constant level will next be explained.

The following image recording methods of the fourth and fifth aspects of the present invention can be used to correct the fading of an image exposed on a negative or positive recording material (e.g., a negative film or a positive film).

In the image recording method of the fourth aspect, before the negative or positive recording material (e.g., the negative film or the positive film) is developed, an image is exposed on the recording material and a pattern having predetermined color and density is exposed on a region of the recording material outside the region at which the image is exposed. The recording material is then developed. Thereafter, digital image data and digital pattern data are obtained by digitally reading from the developed recording material the image and the pattern which have faded and deteriorated over the time. On the basis of the color and density of the pattern based on the obtained digital pattern data density (i.e., the color and density of the discolored and deteriorated pattern) and the predetermined color and density of the pattern, for example, the amount of decrease in saturation and the amount of decrease in brightness are detected for each of the colors of cyan, magenta and yellow. Further, fading correction is carried out on the above obtained digital image data (i.e., the faded and deteriorated digital image data) such that the detected amounts of decrease in saturation and brightness for each of the above colors are compensated for, and the original image (the image at the time of exposure onto the recording material) is reproduced. The image is then newly recorded onto another recording material on the basis of the corrected digital image data.

In the image recording method of the fifth aspect, before the negative or positive recording material is developed, an image is exposed on the recording material and a pattern having predetermined color and density is exposed on a region of the recording material outside the region at which the image is exposed. The recording material is then developed. Thereafter, the density of the pattern which has faded and deteriorated over time is measured per color from the developed recording material. On the basis of the measured density of each color or the pattern (i.e., the density of each color of the faded and deteriorated pattern) and the predetermined color and density of the pattern, for example, the amount of decrease in saturation and the amount of decrease in brightness are detected for each of the colors of cyan, magenta and yellow. The exposure conditions of the image are then corrected such that the detected amounts of decrease in saturation and brightness for each of the above colors are compensated for, and the original image (the image at the time of exposure onto the recording material) is reproduced. Further, the image is newly exposed onto another recording material on the basis of the corrected exposure conditions.

In the image recording methods of the fourth and fifth aspects, the digital image data or the exposure conditions are corrected such that the fading correction amount of the image is provided on the basis of the amount of fading of the pattern recorded on the same recording material as the faded and deteriorated image. Accordingly, it is possible to compensate for the amount of decrease in saturation and the amount of decrease in brightness for each of the cyan, magenta and yellow colors so that the fading of the image can be suitably corrected. Further, the amounts of fading of the pattern and the image can be considered equal to each other regardless of the conditions under which the recording material (here, a negative film, a positive film, or the like) is stored. Thus, the fading of the image can be suitably corrected on the basis of the amount of fading of the pattern as mentioned above.

Further, the image is newly recorded (or exposed) onto another recording material on the basis of the digital image data or the exposure conditions which have been suitably subjected to fading-correction as mentioned above. Since the amount of fading is not judged by the visual sense of a person, no variation in accuracy of the fading correction is caused, and an image quality can be stabilized to a constant level.

The following image recording methods of the sixth and seventh aspects of the present invention can be adopted to correct the fading of an image exposed on a recording material such as photographic paper or the like.

In the image recording method of the sixth aspect, when an image is recorded onto the recording material, the image is recorded onto the recording material and a pattern having predetermined color and density are recorded on a region of the recording material outside an image recording region. Thereafter, digital image data and digital pattern data are obtained by digitally reading the recording material on which are recorded the image and the pattern which have faded and deteriorated over time. The differences between the color and density of the pattern based on the obtained digital pattern data (i.e., the color and density of the faded and deteriorated pattern) and the predetermined color and density of the pattern are determined. Thus, for example, the amount of decrease in saturation and the amount of decrease in brightness are detected for each of the colors of cyan, magenta and yellow. Further, fading correction is carried out on the above obtained digital image data (i.e., the faded and deteriorated digital image data) such that the above detected amounts of decrease in saturation and brightness for each of the above colors are compensated for, and the original image (the image at the time of exposure onto the recording material) is reproduced. The image is then newly recorded on another recording material on the basis of the corrected digital image data.

In the image recording method of the seventh aspect, when an image is exposed onto the recording material, the image is exposed onto the recording material and a pattern having a predetermined color and density are exposed on a region of the recording material outside an image recording region. Thereafter, the density of the pattern which has faded and deteriorated over time is measured per color from the recording material. The differences between the measured density of each color of the faded and deteriorated pattern and the predetermined densities of each color of the pattern are determined. Thus, for example, the amount of decrease in saturation and the amount of decrease in brightness are detected for each of the colors of cyan, magenta and yellow. Further, exposure conditions of the image are corrected such that the detected amounts of decrease in saturation and brightness for each of the above colors are compensated for, and the original image (the image at the time of exposure onto the recording material) is reproduced. Further, the image is newly exposed onto another recording material on the basis of the corrected exposure conditions.

In the image recording methods of the sixth and seventh aspects, the digital image data or the exposure conditions are corrected such that the fading correction amount of the image is provided on the basis of the amount of fading of the pattern recorded on the same recording material (photographic paper or the like) as the faded and deteriorated image. Accordingly, it is possible to compensate for the amount of decrease in saturation and brightness for each of the cyan, magenta and yellow colors so that the fading of the image can be suitably corrected. Further, the amounts of fading of the pattern and the image cab be considered equal to each other regardless of the storage conditions of the recording material (the photographic paper of the like). Thus, the fading of the image can be suitably corrected on the basis of the amount of fading of the pattern as mentioned above. Further, since the amount of fading is not judged by the visual sense of a person, no dispersion variation in accuracy of the fading correction is caused, and image quality can be stabilized to a constant level.

The following image recording methods of the eight and ninth aspects of the present invention can be used to correct fading with respect to both fading deterioration of an image of a negative or positive photosensitive material used at the time of photographing and the fading deterioration of an image of a photographic paper or the like used at the time of making a color print.

In the image recording method of the eighth aspect, before a negative or positive first recording material (e.g., a negative film, a positive film or the like) is developed an image is exposed onto the recording material, and a pattern having predetermined color and density is exposed on a region of the first recording material outside an image exposure region. This first recording material is then developed. Thereafter, the image and the pattern, which have faded and deteriorated over time, of the developed first recording material are printed onto a second recording material so as to form a printed image and a printed pattern. Thereafter, digital image data and digital pattern data are obtained by digitally reading the printed image and the printed pattern which have faded and deteriorated with the further passage of time. The differences between the color and density of the pattern based on the obtained digital pattern data (i.e., the color and density of the faded and deteriorated pattern) and the predetermined color and density of the pattern are determined. Thus, for example, the amount of decrease in saturation and the amount of decrease in brightness are detected for each color of cyan, magenta and yellow. Further, fading correction is carried out on the above obtained digital image data (i.e., the faded and deteriorated digital image data) such that the above detected amounts of decrease in saturation and brightness for each of the above colors are compensate for, and the original image (the image at the time of exposure onto the negative or positive recording material) is reproduced. The image is then newly recorded onto a third recording material on the basis of the corrected digital image data.

In the image recording method of the ninth aspect, an image is exposed onto a negative or positive recording material and a pattern having predetermined color and density is exposed onto a region of the recording material outside the image exposure region. The recording material is then developed. After time passes, the faded and deteriorated image and pattern on the recording material are exposed onto a second recording material so that a printed image is formed. Further, the density of the pattern which has faded and deteriorated over time is measured for each color. The differences between the measured densities of each color of the faded and deteriorated pattern and the predetermined densities of the pattern are determined. Thus, for example, the amount of decrease in saturation and brightness are detected for each color of cyan, magenta and yellow. Further, the exposure conditions of the image are corrected such that the detected amounts of decrease in saturation and brightness for each of the above colors are compensated for, and the original image (the image at the time of exposure onto the negative or positive recording material) is reproduced. Further, the image is newly exposed onto a third recording material on the basis of the corrected exposure conditions.

As mentioned above, in the image recording methods of the eighth and ninth aspects, the pattern is exposed on the same negative or positive recording material as the image, and the image and the pattern which have faded and deteriorated to the same extent are exposed onto the same second recording material (photographic paper or the like) so that a printed image is made. For the image and the pattern which have faded and deteriorated to the same extent, the digital image data or the exposure conditions are corrected such that a fading correction amount of the image is provided on the basis of a amount of fading of the pattern. Accordingly, it is possible to correct fading with respect to both an amount of fading deterioration of the image recorded on the negative or positive recording material and the amount of fading deterioration of the image recorded on the second recording material. The amount of fading of the pattern and the image can be considered equal to each other regardless of the storage conditions of the negative or positive recording material and the second recording material (photographic paper or the like). Accordingly, the fading of the image can be suitably corrected on the basis of the amount of fading of the pattern as mentioned above. Further, since the amount of fading is not judged by the visual sense of a person being, no variation in accuracy of the fading correction is caused, and image quality can be stabilized to a constant level.

In the image recording methods of the above fourth, fifth, eighth and ninth aspects, the pattern having the predetermined color and density may be exposed onto a region of the negative or positive recording material outside the image exposure region at the time of manufacturing the recording material, or at the time of exposing (photographing) the image onto the recording material. Further, this pattern may be exposed immediately before the recording material is subjected to developing processing.

A thermal developing photosensitive material which sill be described later can be used as the recording material in the above first or second aspect, or as the recording material used in the image recording methods of the fourth, fifth, eighth and ninth aspects.

When a thermal developing photosensitive material is used, the thermal developing photosensitive material and a processing member having a layer including at least a mordant on a supporting body may be superposed one on top of the other during the developing processing such that an image is formed on the thermal developing photosensitive material by heating the thermal developing photosensitive material and the processing member which are superposed.

The above thermal developing photosensitive material and the above processing member will next be explained in detail. The thermal developing photosensitive material and the processing member may be the following material and member which are disclosed in Japanese Patent Application No. 7-234600.

The thermal developing photosensitive material may be a photosensitive material which has, on a supporting body, at least three types of photosensitive layers which include at least a photosensitive silver halide, a binder, and a nondiffusable coloring material which releases diffusable dyes corresponding to or reverse-corresponding to silver development, the photosensitive wavelength regions being respectively different for each of the three types of photosensitive layers, and the hues after development of the coloring material being respectively different for each of the three types of photosensitive layers.

The above three types of photosensitive layers are each preferably a layer photosensitive to any one of blue, green and red lights. These three photosensitive layers are generally arranged in the sequential order of the red, green and blue photosensitive layers from a side of the supporting body side. However, another arrangement different from this arrangement may be used in accordance with the intended purpose. For example, the arrangement described in paragraph 162 of Japanese Patent Application Laid-Open (JP-A)

No. 7-152129 may be used. The respective photosensitive layers substantially have the same color sensitive properties, but may be divided into plural silver halide emulsion layers having different photosensitivities.

The relation of spectral sensitivities of the respective layers and hues of the diffusable dyes matter formed or discharged from the coloring material is arbitrary. However, when cyan, magenta and yellow coloring materials are used in the red, green and blue photosensitive layers respectively, an image can be easily written onto a the conventional photographic paper or the like.

Various types of non-photosensitive layers such as a protecting layer, an undercoating layer, an intermediate layer, a yellow filter layer, an antihalation layer or the like may be formed in addition to the above silver halide emulsion layer. Various types of auxiliary layers such as a back layer or the like can be also formed on the opposite side opposed to the supporting body. Further, a magnetic recording layer may also be formed.

The silver halide emulsion which can be used for the thermal developing photosensitive material is not particularly limited, and any one of silver chloride, silver iodide chloride, silver chloride bromide, silver iodide chloride bromide, silver iodide bromide and silver bromide may be used.

The above thermal developing photosensitive material includes a nondiffusable coloring material which releases diffusable dyes corresponding to or reverse-corresponding to a silver development. This nondiffusable coloring material can be represented by the following general formula [LI].

$$((Dye)_m\text{—}Y)_n\text{—}Z \qquad [LI]$$

Dye represents a diffusable dye group, and Y represents a simple linked group. Z represents a group which releases the diffusable $(Dye)_m$—Y corresponding to or reverse-corresponding to a photosensitive silver salt, and which has a property such that LI itself becomes nondiffusable. Further, m represents an integer from 1 to 5, and n represents 1 or 2. When both m and n are not equal to 1, the plural Dyes may be the same or may be different from each other.

The following compounds (1) to (4) are concrete examples of the coloring material represented by the general formula [LI]. The following compounds (1) to (3) release diffusable dyes which reversely-correspond to the development of the silver halide. The following compound (4) releases diffusable dyes corresponding to the development image of the silver halide.

(1) A dye developer in which a hydroquinone-type developer and a dye component are linked, such as those described in U.S. Pat. Nos. 3,134,764, 3,362,819, 3,597,200, 3,544,545 and 3,482,972. Japanese Patent Application Publication (JP-B) No. 3-68387, and the like. This dye developer is diffusable in an alkaline environment, but becomes nondiffusive upon reacting with a silver halide.

(2) A nondiffusable compound, such as that described in U.S. Pat. No. 4,503,137 or the like, which releases diffusable dyes in an alkaline environment, but loses this ability upon reaction with a silver halide.

(3) A nondiffusable compound which releases diffusable dyes upon reaction with the remaining reducing agent not oxidized by development, such as the nondiffusable compounds disclosed in U.S. Pat. No. 4,559,290, European Patent No. 220,746A2, U.S. Pat. No. 4,783,396, Laid-Open Technical Report No. 87-6,199, Japanese Patent Application Laid-Open (JP-A) No. 64-13,546, and the like.

(4) A compound (DRR compound) having a reducing property with respect to silver halides or organic silver salts, and releasing diffusable dyes when a partner is reduced. Since it is not necessary to use another reducing agent in this compound, there is no problem of an image being dirtied by an oxidized decomposed substance of the reducing agent. Typical examples of this compound are described in U.S. Pat. Nos. 3,928,312, 4,053,312, 4,055,428 and 4,336,322, Japanese Patent Application Laid-Open (JP-A) Nos. 59-65839, 59-69839, 53-3819 and 51-104343, RD17,465, U.S. Pat. Nos. 3,725,062, 3,728,113 and 3,443,939, Japanese Patent Application Laid-Open (JP-A) Nos. 58-116537 and 57-179840, U.S. Pat. No. 4,500,626, and the like.

The reducing agent is preferably included in the thermal developing photosensitive material. In this case, the reducing agent may be a reducing agent known in the field of thermal developing photosensitive materials. A coloring material may be also used as the reducing agent. It is also possible to use a reducing agent precursor having no reducing property of its own, but causing a reducing property by a nucleophilic reagent and a thermal action in the developing process.

When a nondiffusing reducing agent is used, an electron transmitting agent and/or an electron transmitting agent precursor can be used in combination as needed in order to accelerate movement of electrons between the diffusion-proof reducing agent and a developable silver halide.

It is preferable to use a base or a basic precursor in the thermal developing photosensitive material so as to accelerate silver development and the dye forming reaction. Examples of the basic precursor are salts of an organic acid and a base decarbonated by heat, compounds releasing an amine class by an intramolecular nucleophilic substitution reaction, Rossen rearrangement or Beckmann rearrangement; and the like.

A heat solvent may be added to the thermal developing photosensitive material so as to accelerate the thermal development. For example, organic compounds having polarities such as those described in U.S. Pat. Nos. 3,347, 675 and 3,667,959 may be used as the heat solvent.

The supporting body of the thermal developing photosensitive material is a supporting body capable of withstanding processing temperatures. This supporting body is generally a supporting body for a photograph such as paper, synthetic polymer (film), and the like described on pp, 223 to 240 of [Fundamentals of photographic Engineering—Silver Salt Photography Edition. ] edited by the photographic Society of Japan and published by Corona-Sha Co., Ltd. in 1979.

The processing member will next be explained. The processing member may be processing member having a layer (processing layer) including a mordant for taking dyes diffused from the thermal developing photosensitive material at the time of thermal development. The processing layer may be separately coated and formed on a supporting body different than the supporting body of material, or may be coated and formed on the same supporting body as that of the photosensitive material. However, it is preferable to form the processing member on a separate supporting body. The mordant may be a mordant well-known in the photographic field. For example, the mordant may be a mordant described in columns 58 and 59 of U.S. Pat. No. 4,500,626, or a mordant described in pp. 32 to 41 of Japanese Patent Application Laid-Open (JP-A) No. 61-88256, or a mordant described in Japanese Patent Application Laid-Open (JP-A) Nos. 62-244043 or 62-244036 or the like. A polymer compound having a coloring matter receiving property as described in U.S. Pat. No. 4,463,079 also may be used as the mordant. The binders used in the photosensitive material can be used as the binder of the processing layer. It is useful to provide a protecting layer on the processing layer.

A base or a basic precursor required for development can be included in the processing layer of the processing member. For example, when a method for generating a base by combining the above-mentioned basic metal compound which is difficult to dissolve in water, metal ions forming this basic metal compound, and a complex forming compound is used, the basic metal compound which is difficult to dissolve in water is added to a structural layer of the thermal developing photosensitive material in advance and the complex forming compound is added to the processing layer of the processing member in advance. At the time of thermal development, a small amount of water is supplied to the photosensitive material or the processing member, and the photosensitive material and the processing member are then superposed one on the top of the other so that the base can be generated. A heat solvent can be included in the processing layer of the processing member to accelerate development and removal of unnecessary substances.

Next, other examples of thermal developing photosensitive materials and processing members which can be used will be explained. In these examples, the thermal developing photosensitive material and the processing members can be the thermal developing photosensitive material and processing member disclosed in Japanese Patent Application No. 7-268045 as follows.

The thermal developing photosensitive material can be a thermal developing photosensitive material having at least three kinds of photosensitive layers on a supporting body. These photosensitive layers include at least a photosensitive silver halide, a binder and a dye-providing coupler. The photosensitive wavelength regions of the respective photosensitive layers are different from each ether, and the hues of the dyes formed from the dye-providing couplers are different from each other for each photosensitive layer. A developing agent able to form the dyes upon reaction with the dye-providing couplers is preferably included in the photosensitive material.

The above three kinds of photosensitive layers are preferably a layer photosensitive to one of blue, green and red lights. The three kinds of photosensitive layers are generally arranged in the order of the red, green and blue photosensitive layers sequentially from the supporting body side. However, another arrangement different from this arrangement may be used in accordance with the intended purpose. For example, the arrangement described in paragraph 162 of Japanese Patent Application Laid-Open (JP-A) No. 7-152129 may be used. The respective photosensitive layers substantially have the same color sensitive properties, but may be also divided into plural silver halide emulsion layers having different photosensitivities.

The relations of the spectral sensitivities of the respective layers and the hues of the couplers are arbitrary. However, an image is easily written onto a conventional photographic paper or the like when cyan, magenta and yellow couplers are used in the red, green and blue photosensitive layers respectively.

Various kinds of non-photosensitive layers such as a protecting layer, an undercoating layer, an intermediate layer, a yellow filter layer, an antihalation layer or the like may be formed in addition to the above silver halide emulsion layer. Various kinds of auxiliary layers such as a back layer or the like can be also formed on the opposite side of the supporting body. Further, a magnetic recording layer may also be formed.

The coupler which can be used in the above thermal developing photosensitive material may be a 4-equivalent coupler or a 2-equivalent coupler. The nondiffusing group may be a polymer chain. Concrete examples of the coupler are those disclosed in detail in T. H. James [The Theory of the Photographic Process], fourth edition, pp. 291 to 334 and pp. 354 to 361, Japanese Patent Application Laid-Open (JP-A) Nos. 58-123533, 58-149046, 58-149047, 59-111148, 59-124399, 59-174835, 59-231539, 59-231540, 60-2950, 60-2951, 60-14242, 60-23474 and 60-66249, Japanese Patent Application Nos. 6-270700, 6-307049 and 6-312380, and the like.

The above thermal developing photosensitive material preferably includes a color developing agent capable of generating a dyes when an oxidant generated by silver development couplers with the above coupler, in order to shorten the developing time, improve the sensitivity, improve the image density, and the like.

For example, it is possible to use a combination of a p-phenylene diamine type developing agent and a phenol or an active methylene coupler as disclosed in U.S. Pat. No. 3,531,256, or the combination of a p-aminophenol type developing agent and an active methylene coupler as disclosed in U.S. Pat. No. 3,761,270. When a color developing agent is included in the thermal developing photosensitive material, a precursor of the color developing agent may be used. For example, this precursor may be the indoaniline type compound described in U.S. Pat. No. 3,342,597, the Schiff base type compound described in U.S. Pat. No. 3,342,599 and Research Disclosure Nos. 14,850 and 15,159, the aldol compound described in Research Disclosure No. 13,921, the metal salt complex described in U.S. Pat. No. 3,719,492, the urethane type compound described in Japanese Patent Application Laid-Open (JP-A) No. 53-135628 or the like.

The silver halide, the dye-providing coupler and the developing agent may be included in the same layer, but can be added to different layers if the silver halide, the dye-providing coupler and the developing agent are in a reactable state. For example, when the layer including the developing agent and the layer including the silver halide are different layers, the raw stock storability of the sensitive material is improved.

An organic metal salt can also be used as an oxidizing agent together with the photosensitive silver halide. An organic silver salt is particularly preferably used as the organic metal salt. Example of organic compounds which can be used to form the above organic silver salt oxidizing agent are the benzotriazoles described in columns 52 and 53 of U.S. Pat. No. 4,500,626, and the like, a fatty acids, and other compounds.

When a nondiffusing developing agent is used, an electron transmitting agent and/or an electron transmitting agent precursor can be used in combination as needed so as to accelerate the movement of electrons between the nondiffusing developing agent and the developable silver halide.

A base or a basic precursor is preferably used in the thermal developing photosensitive material to accelerate silver development and the dye forming reaction. The basic precursor may be a salt of an organic acid and a base decarbonated by heat, a compound releasing an amine by an intramolecular nucleophilic substitution reaction, Rossen rearrangement or Beckmann rearrangement or the like.

A heat solvent may be added to the thermal developing photosensitive material so as to accelerate the thermal development. For example, organic compounds having polarities such as those described in U.S. Pat. Nos. 3,347,675 and 3,667,959 may be are used as the heat solvent.

The supporting body of the thermal developing photosensitive material is a supporting body capable of withstanding processing temperatures. This supporting body is generally a supporting body for a photograph such as paper, synthetic polymer (film), and the like described on pp. 223 to 240 of [Fundamental of photographic engineering—Silver Salt Photography Edition—] edited by the Photographic Society of Japan and published by Corona-sha Co., Ltd. in 1979.

Another example of the processing member will next he explained. The processing member is provided with a processing layer formed on a supporting body different from that of the photosensitive material. In the thermal development process, the processing layer blocks air at the time of heat-development, prevents the scattering of material from the sensitive material, supplies materials for processing to the photosensitive material, and removes materials (YF dye, AH dye, etc.) in the photosensitive material which become unnecessary after development or an unnecessary components generated during development. At the time of thermal developing processing, the processing layer is superposed on a photosensitive layer surface of the photosensitive material, and heated and used. A supporting body and binder similar to those of the photosensitive material may by used for the supporting body and a binder of the processing member.

A mordant may be added to the processing layer of the processing member for the purpose of removal of the above dyes and for other purposes. The mordant may a mordant well-known in a photographic field. For example, the mordant may be any of the mordants described in columns 58 and 59 of U.S. Pat. No. 4,500,626, on pp. 32 to 41 of Japanese Parent Application Laid-Open (JP-A) No. 61-88256, in Japanese Patent Application Laid-Open (JP-A) Nos. 62-244043 and 62-244036 or the like. A polymer compound having a dye matter receiving property as described in U.S. Pat. No. 4,463,079 may be also used as the mordant.

A base or a basic precursor required for development can be included in the processing layer of the processing member. For example, when a method for generating a base by combining the above-mentioned basic metal compound which is difficult to dissolve in water, metal ions forming this basic metal compound, and a complex forming compound is used, the basic metal compound which is difficult to dissolve in water is added to a structural layer of the thermal developing hotosensitive material in advance and the complex forming compound is added to the processing layer of the processing member in advance. At the time of thermal developing, a small amount of water is supplied to the photosensitive material or the processing member, and the photosensitive material and the processing member are then superposed one on top of the other so that the base can be generated. A heat solvent can be included in the processing layer of the processing member to accelerate development and removal of unnecessary substances.

BRIEF DESCRIPTION OF THE DRAWINGS

FIG. 1 is a perspective view showing the exterior of an image recording device in an embodiment of the present invention.

FIG. 8 is a flow chart showing a control routine of processing for making a patterned photograph print in a first embodiment.

FIG. 17A is a view showing a vicinity of a printing position of a negative film in the printer shown in FIG. 15.

FIG. 17B is a cross-sectional view taken along line T—T in FIG. 17A.

FIG. 20 is a block diagram shoving structural elements relating to the writing processing of a four-color patch onto the negative film in the third and fourth embodiments.

FIG. 25 is a flow chart showing a control routine of the reading-correction processing of a frame image for correcting a amount of fading of each frame image when each frame image of the faded negative film is digitally read and is exposed onto the photographic paper.

DESCRIPTION OF THE PREFERRED EMBODIMENTS

First Embodiment

A first embodiment of the present invention will next be described in detail with reference to the drawings. This first embodiment corresponds to the invention of claim 6. Embodiments of the inventions of claims 1 to 3 are also explained in this first embodiment.

Figure 2:
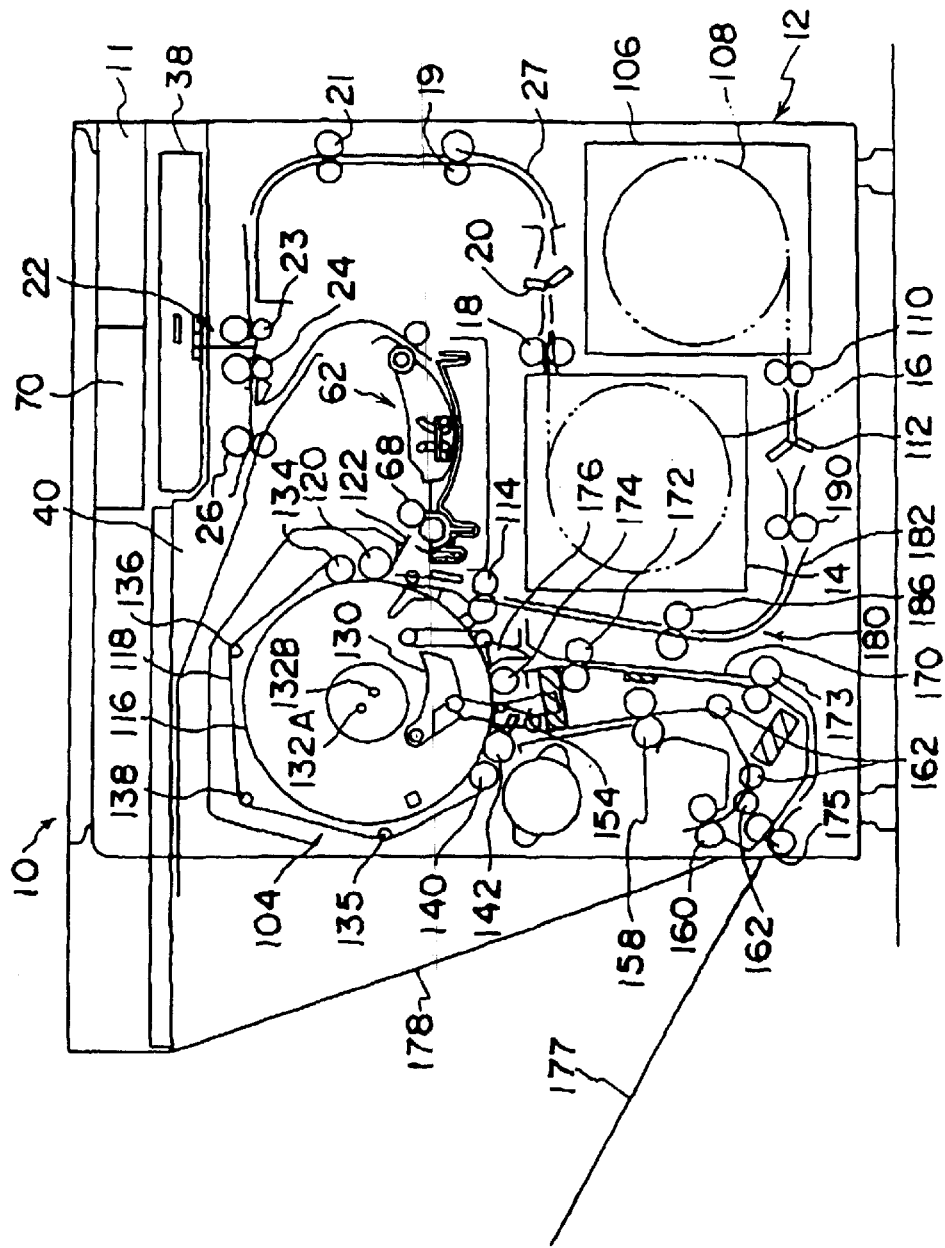
FIG. 2 is a schematic structural view of the image recording device.

FIG. 1 is a view showing the exterior of an image recording device 10 for executing a fading correction method of the present invention. FIG. 2 is a schematic structural view of this image recording device 10.

As shown in FIG. 1, the image recording device 10 is box-shaped on the whole, and a front door 13 and a side door 15 are attached to a device base 12. The interior of the device base 12 can be exposed by opening these doors.

As shown in FIG. 2, a frame image reading section 11, an image scan reading section 70 and an exposure device 38 are provided in an upper portion of the image recording device 10. The frame image reading section 11 reads the respective frame images of a photographed negative film. The image scan reading section 70 scans and reads an image recorded on a photograph print. The exposure device 38 exposes, onto a photosensitive material 16, the frame image read by the frame image reading section 11, a corrected image provided by correcting the image read by the image scan reading section 70 or the like to a photosensitive material 16. These sections will be explained later.

A sensitive material magazine 14 is provided within the device base 12 of the image recording device 10. The photosensitive material 16 is wound in a roll shape and is stored in the sensitive material magazine 14. This photosensitive material 16 is wound such that the photosensitive (exposure) surface is directed inwardly. The photosensitive material 16 may provide negative images upon exposure, or may provide positive images upon exposure.

A nip roller 18 and a cutter 20 are disposed in the vicinity of a photosensitive material removal opening of the sensitive material magazine 14. The photosensitive material 16 can be cut after the a predetermined length thereof is pulled out of the sensitive material magazine 14.

Plural pairs of conveying rollers 19, 21, 23, 24, 26 and a guide plate 27 are disposed at a side of the cutter 20 so that the photosensitive material 16 cut to the predetermined length can be conveyed to an exposure section 22.

The exposure section 22 is located between conveying rollers 23 and 24. The exposure portion (exposure point) is set between these conveying rollers so that the photosensitive material 16 passes through this exposure portion. Therefore, the photosensitive material 16 is conveyed by these conveying rollers 23 and 24 along the sub-scanning direction.

Figure 5:
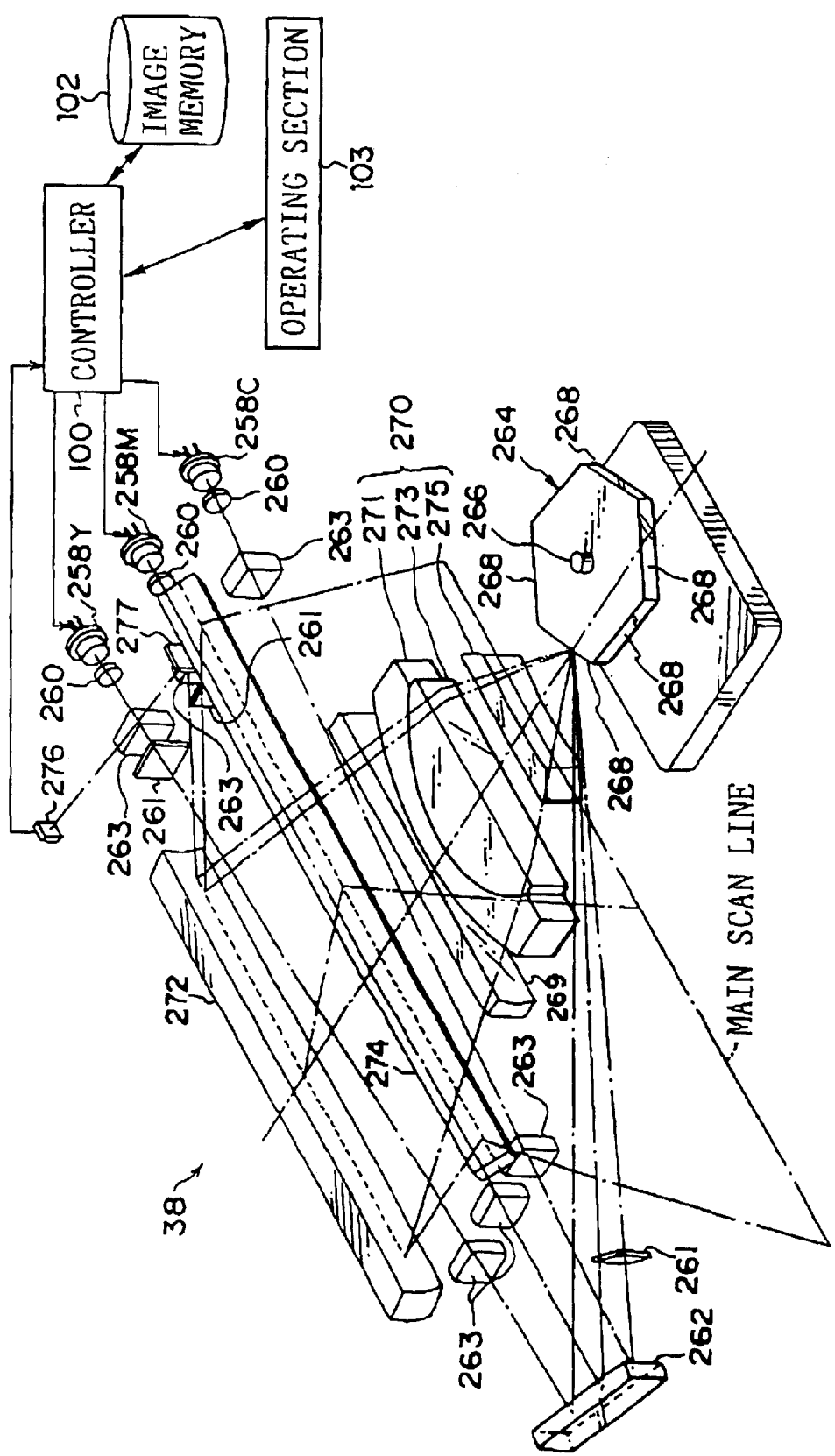
FIG. 5 is a schematic structural view of an exposing device.

The exposure device 38 is provided directly above the exposure section 22. As shown in FIG. 5, a semiconductor laser 258C (light emitting wavelength 750 nm) serving as a light source for generating cyan color, a semiconductor laser 258M (light emitting wavelength 680 nm) serving as a light source for generating magenta color, and a semiconductor laser 258Y (light emitting wavelength 810 nm) serving as a light source for generating yellow color are provided in the exposure device 38.

A controller 100 is connected to each of these semiconductor lasers 258C, 258M and 258Y. The controller 100 controls the emitting timings and the light intensities of the light beams emitted from the semiconductor lasers on the basis of digital image data to be exposed. An image memory 102 and an operating section 103 are connected to the controller 100. The image memory 102 stores the digital image data to be exposed, and the like. The operating section 103 is constructed by an unillustrated keyboard, buttons, and the like for instructing operations such as start, stoppage, and the like of various kinds of processings by an operator.

The controller 100 includes an unillustrated microcomputer and controls the electric currents supplied to the semiconductor lasers 258C, 258M, 258Y such that the digital image data of an image to be exposed are read from the image memory 102, and light beams based on these digital image data are emitted at suitable emitting timings and light intensities.

Figure 7A:
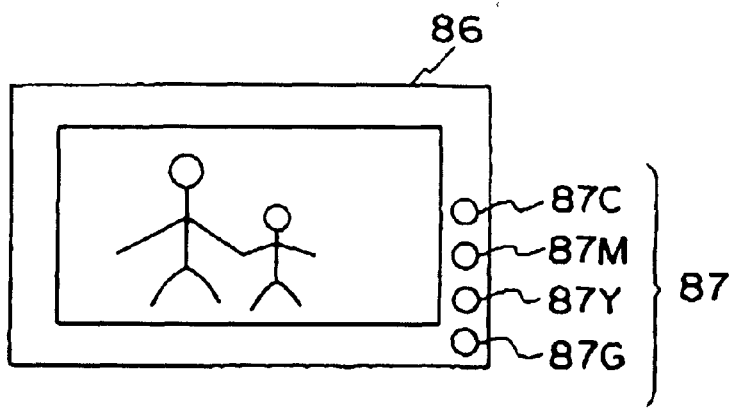
FIG. 7A is a view showing a photograph print to which a four-color patch has been applied.

As described later in detail, the controller 10 has the function of causing the light beams to be emitted based on the digital image data for adding a predetermined pattern to the frame image read by the frame image reading section 11, and the digital image data made by correcting a faded image of the photograph print read by the image scan reading section 70, and the like. As shown in FIG. 7(A), an image formed by adding a predetermined pattern to the above frame image may be an image in which cyan, magenta, yellow and gray patterns 87C, 87M, 87Y and 87G having predetermined saturations and brightnesses are applied outside an image recording region. The above four patterns are called a four-color patch.

The controller 100 is also connected to a photosensitive material conveying system and an image receiving material conveying system, which will be described later, through unillustrated signal lines. The controller 100 controls operations of these systems such that timings for conveying the photosensitive material 16 and the receiving image material 108 (see FIG. 2) and the timings for emitting the light beams from each of the above semiconductor lasers are synchronized with each other.

As a illustrated in FIG. 5, a collimator lens 260 is disposed in the vicinity of the emitting side of each of the semiconductor lasers 258C, 258M, 258Y. The collimator lenses 260 change the light beams emitted from the semiconductor lasers 258C, 258M, 258Y from a diffused light beams to parallel light beams. Each light beam which has been changed to a parallel light beam by the collimator lens 260 passes through a cylindrical lens group 263 and a light amount adjusting filter 261, is incident on a reflecting mirror 262, and is reflected by the reflecting mirror 262. The light beam is then converged onto a reflecting surface 268 of a polygon mirror 264. Note that the cylindrical lens 263 has a function for shaping the light beam in the sub-scanning direction.

The polygon mirror 264 has six reflecting surfaces 268 and is rotated at high speed (125 rotations per second as one example) around a shaft 266 by driving force from an unillustrated motor. The polygon mirror 264 functions to continuously change the incident angle of the light beam on each of the reflecting surfaces 268 and deflect the light beam. Namely, the polygon mirror 264 deflects each light beam to scan the light beam along a main scanning direction.

An $f^\theta$ lens system 270 is provided in the advancing direction of the light beam which has been deflected by the polygon mirror 264. The $f^\theta$ lens system 270 converges the deflected light beams (namely, each of the light beams for generating yellow, magenta and cyan colors) onto the photosensitive material 16 of the exposure section 22. This $f^\theta$ lens system 270 is constructed by lenses 271, 273, 275, and functions to make an optical adjustments such that image forming points on the photosensitive material 16 formed by the respective light beams for generating the yellow, magenta and cyan colors coincide with each ocher and are moved at an equal speed on the photosensitive material 16.

A cylindrical lens 269 and a cylindrical mirror 272 are sequentially arranged in the advancing direction of the light beam transmitted through the above $f^\theta$ lens system 270. A reflecting mirror 274 is disposed in the advancing direction of the light beam reflected by the cylindrical mirror 272. This reflecting mirror 274 is inclined by a predetermined angle such that the light beam reflected by a surface of the reflecting mirror 274 is reflected substantially vertically downward.

An SOS (Start Of Scan) mirror 277 is disposed at a side of the reflecting mirror 274 so that the light beam reflected on the polygon mirror 264 is first irradiated onto this SOS mirror 277. The first irradiated light beam (the light beam corresponding to a vicinity of the main scan starting point) is reflected on the SOS mirror 277 and made incident on an SOS sensor 276. When the light beam is made incident on the SOS sensor 276 from the SOS mirror 277, the SOS sensor 276 outputs a predetermined signal. This output signal is inputted to the controller 100 so that the controller 100 detects the start of scan.

Figure 4:
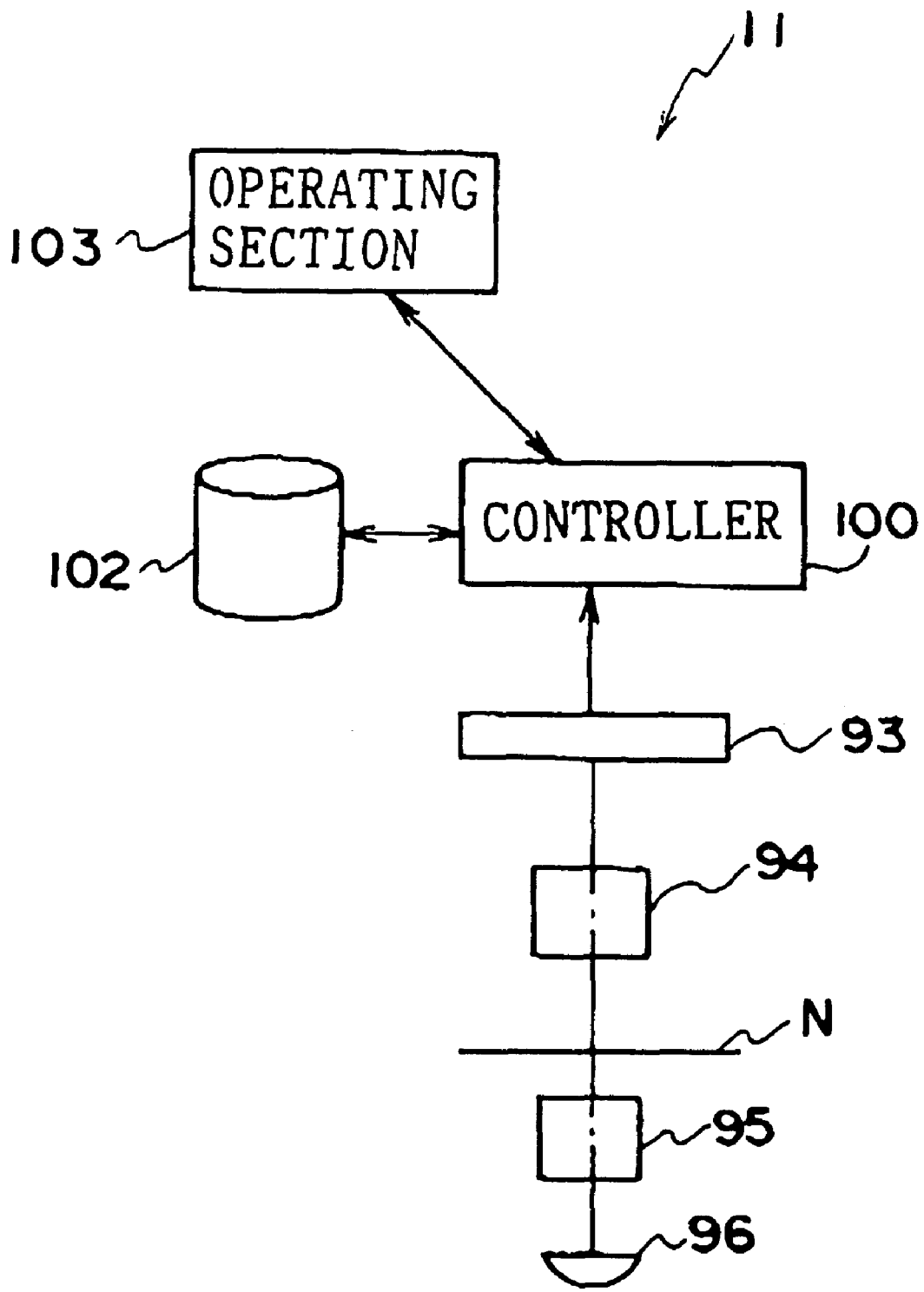
FIG. 4 is a block diagram showing the structure of a frame image reading section.

The frame image reading section 11 is provided above the exposure device 38. As shown in FIG. 4, a light source 96 formed by a halogen lamp are the like is provided in this frame image reading section 11. A diffusing tube 95, a lens 94 and a CCD area sensor 93 are arranged in that order along the emitting direction of light from the light source 96. A negative film N, on which a frame image which is the object of reading is recorded, is set at a predetermined reading position between the diffusing tube 95 and the lens 94.

The light from the light source 96 is transmitted through a frame of the negative film N and is converged onto the CCD area sensor 93 by the lens 94. At this time, the frame image of the negative film N is formed as an image on the CCD area sensor 93 and is read by the CCD area sensor 93.

The image read by the CCD area sensor 93 is converted by the above controller 100 from an analog image to a digital image (hereinafter, called A/D conversion). Thereafter, the image is subjected to various kinds of image processings which will be described later, and the processed image is stored in the image memory 102.

Figure 6:
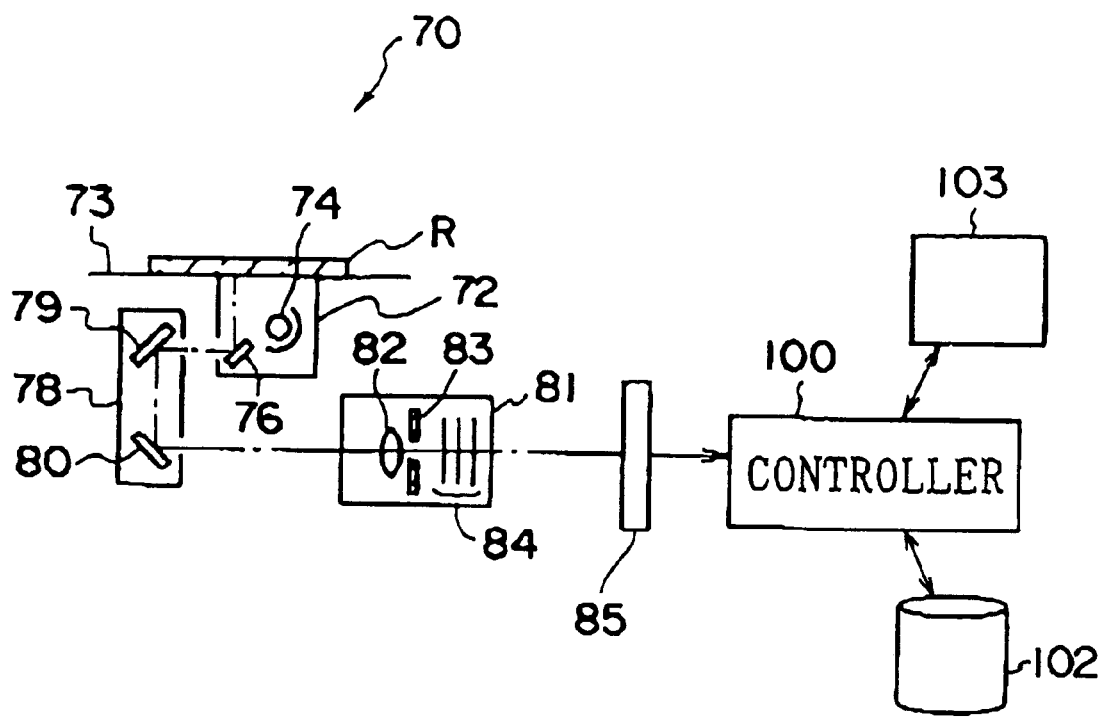
FIG. 6 is a schematic structural view of an image scan reading section.

As shown in FIG. 2, the image scan reading section 70 is provided adjacent to the above frame image reading section 11. As shown in FIG. 6, a lamp unit 72, a mirror unit 78, a filter unit 81 and a CCD line sensor 85 are arranged in this image scan reading section 70.

The lamp unit 72 is formed by a halogen lamp 74, which is formed in a bar shape are serves as a light source, and a first mirror 76. The mirror unit 78 is formed by a second mirror 79 and a third mirror 80. Further, the filter unit 81 has a color adjusting filter 84 for adjusting three kinds of colors (cyan, magenta and yellow), a lens 82 and a diaphragm mechanism 83.

Light from the halogen lamp 74 is reflected by a photograph print R, and this reflected light is sequentially reelected on the first mirror 76, the second mirror 79 and the third mirror 80, and is then incident on the filter unit 81. The color of the light incident on the filter unit 81 is adjusted by the color adjusting filter 84, and the light is focused by the lens 82 and is formed as an image on the CCD line sensor 85.

The above lamp unit 72 and the mirror unit 78 are moved along a placement stand 73 on which the photograph print R is pleced. Thus, the image recorded on the photograph print R is scanned, and the scan light (the light reflected from the photograph print R) is detected by the CCD line sensor 85 so that the image recorded on the photograph print R can be read.

As shown in FIG. 2, a switch back portion 40 is provided at the side of the exposure section 22, and a water coating section 62 is provided under the exposure section 22. The photosensitive material 16 exposed at the exposure section 22 is sent into the switch back portion 40. Thereafter, the photosensitive material 16 is sent, by reversely rotating a conveying roller 26, to the water coating section 62 through a conveying path provided below the exposure section 22. Plural pipes are connected to the water coating section 62 so that water can be supplied to the water coating section 62. A thermal developing transfer section 104 is disposed at a side of the water coating section 62 so that the photosensitive material 16 coated with water is sent to this thermal developing transfer section 104.

A receiving material magazine 106 is provided with the device base 12 at a side of the sensitive material magazine 14. An image receiving material 108 is wound in a roll shape and is accommodated in the receiving material magazine 106. The image forming surface of the receiving image material 108 is coated with a dye fixing material having a mordant. The image receiving material 108 is wound such that this image recording surface faces inwardly.

A nip roller 110 is disoposed in the vicinity of an image receiving material removal opening of the receiving material magazine 106. The nip roller 110 can pull the image receiving material 108 out of the receiving material magazine 106 and can release the nipping thereof. A cutter 112 is provided at a side of the nip roller 110.

An image receiving material conveying section 180 is provided at a side of the cutter 112 and at a side of the sensitive material magazine 14. Conveying rollers 186, 190, 114 and a guide grate 182 are provided in the image receiving material conveying section 180 so that the receiving image material 108 cut to a predetermined length can be conveyed to the thermal developing transfer section 104.

The photosensitive material 16 conveyed to the thermal developing transfer section 104 is sent between a laminating roller 120 and a heating drum 116. Further, synchronously with the conveying of the photosensitive material 16, the image receiving material 108 is conveyed between the laminating roller 120 and the heating drum 116 and is superposed with the photosensitive material 16 in a state in which the photosensitive material 16 precedes the image receiving material 108 by a predetermined length. A pair of halogen lamps 132A, 132B are disposed within the heating drum 116 such that the temperature of a surface of the heating drum 116 can be raised.

An endless press contact belt 116 is trained about five training rollers 134, 136, 138, 135, 140. The portion of the outer side of the endless press contact belt 116, which portion is located between the winding rollers 134 and 140, press-contacts the outer circumference of the heating drum 116.

Figure 3:
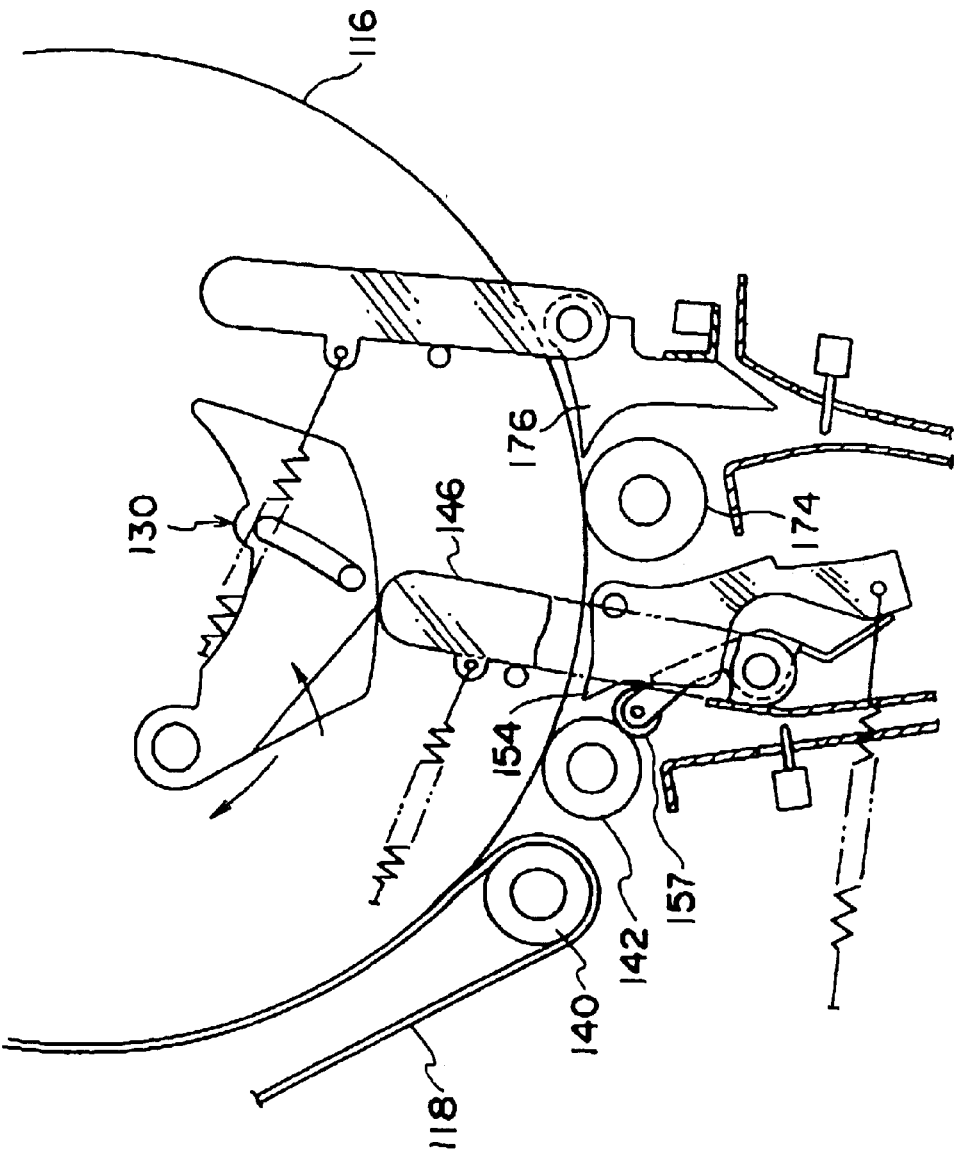
FIG. 3 is a structural view showing a mechanism for separating an image receiving material from a photosensitive material.

As shown in FIGS. 2 and 3, a bending/guiding roller 142 is provided beneath the heating drum 116 at a downstream side of the endless press contact belt 118 in the material supplying direction. A separating claw 154 is disposed beneath the heating drum 116 at the downstream side of the bending/guiding roller 142 in the material supplying direction. This separating claw 154 is made to approach the outer circumference of the heating drum 116 by a cam 130 so as to separate the photosensitive material 16 from the heating drum 116. This separating claw 154 is disposed so as to be rotatable around a predetermined shaft.

The photosensitive material 16 separated by the separating claw 154 is trained about the bending/guiding roller 142 so as to be moved downward, and is then conveyed to a waste photosensitive material accommodating box 178 through conveying rollers 158, 162, 160.

A separating roller 174 and a separating claw 176 are provided in the vicinity of the heating drum 116 at a side of the bending/guiding roller 142. A receiving material guide 170 and receiving material discharging rollers 172, 173, 175 are provided below the separating roller 174 and the separating claw 176 so as to guide and convey the image receiving material 108 which has been separated from the heating drum 116 by the separating roller 174 and the separating claw 176.

The image receiving material 108, which has been separated from the outer circumference of the heating drum 116 by the separating claw 176, is conveyed and discharged into a tray 177 (see FIG. 1) by the receiving material guide 170 and the receiving material discharging rollers 172, 173, 175.

Operation of the first embodiment will next be explained. Here, patterned photograph print making processing and fading correction processing of the present invention are described in that order. In the patterned photograph print making processing, a photograph print to which a pattern 87 (see FIG. 7A) for fading correction is applied (hereinafter called a patterned photograph print) is made. In the fading correction processing, an image of a photograph print (hereinafter called a print image) which has faded over time is corrected after the photograph print is made by the patterned photograph print making processing.

The patterned photograph print making processing will first be explained by using FIGS. 8 to 11. As shown in FIG. 8, the patterned photograph print making processing is mainly formed by the following three processings which are reading processing, image processing and print processing. First, in step 200, each frame image of a negative film N is read and digital image data of each frame image is obtained in the reading processing. In the next step 220, digital image data, in which a pattern for fading correction is added to the above read frame image, is formed in the image processing. Finally, in step 240, a photograph print, on which is recorded an image based on the above made digital image data, is made in the print processing. The patterned photograph print making processing of FIG. 8 begins to be executed by the control section 100 by an operator giving a predetermined starting command by means of the operating section 103 after the operator sets a leading end portion of the negative film N, which is the object of exposure, at a predetermined position in the frame image reading section 11.

The respective processings will next be explained in detail.

Figure 9:
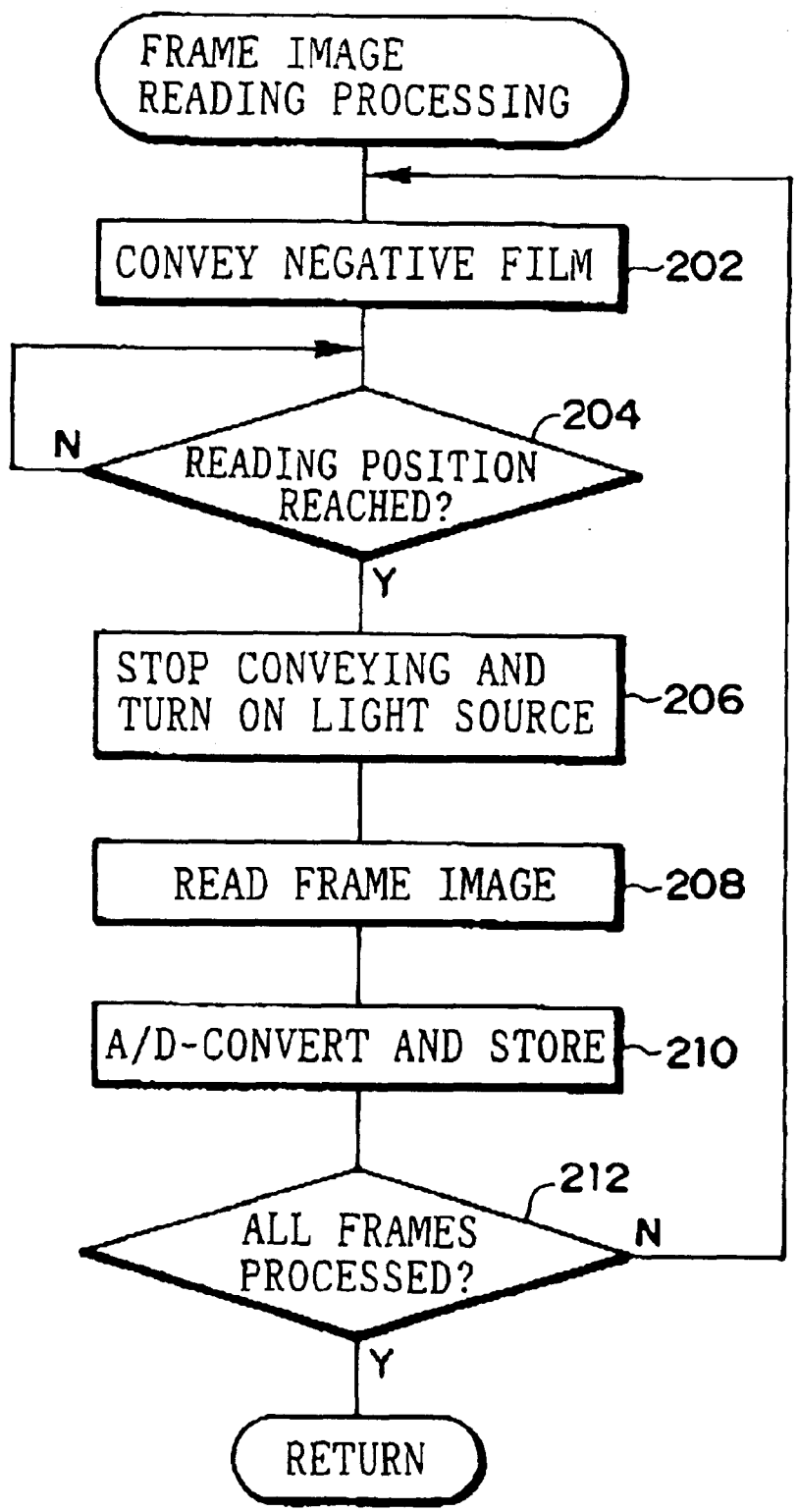
FIG. 9 is a flow chart showing a subroutine of reading processing of a frame image.

In the reading processing of the frame image in step 200 of FIG. 8, a subroutine shown in FIG. 9 is executed. In step 202 of FIG. 9, the negative film N is conveyed in the frame image reading section 11 of FIG. 4. This conveying is continued until it is judged in the next step 204 that the frame, which is the object of reading, has reached a predetermined reading position.

When the frame which is the object of reading reaches the predetermined reading position, the routine proceeds to step 206. In this step 206, the conveying of the negative film N is stopped and the light source 96 is turned on. In the next step 208, an image, which is formed on the CCD area sensor 93 by transmission light which is transmitted through the object frame image of the negative film N, is read by the CCD area sensor 93.

In the next step 210, image information read by the CCD area sensor 93 is A/D-converted, are the digital image data of the converted frame image is stored in the image memory 102.

Thereafter, the above processings in steps 202 to 210 are executed with respect to each frame of the negative film N.

Thus, the respective frames of the negative film N are sequentially read frame-by-frame, and the digital image data of each frame image is stored in the image memory 102.

Figure 10:
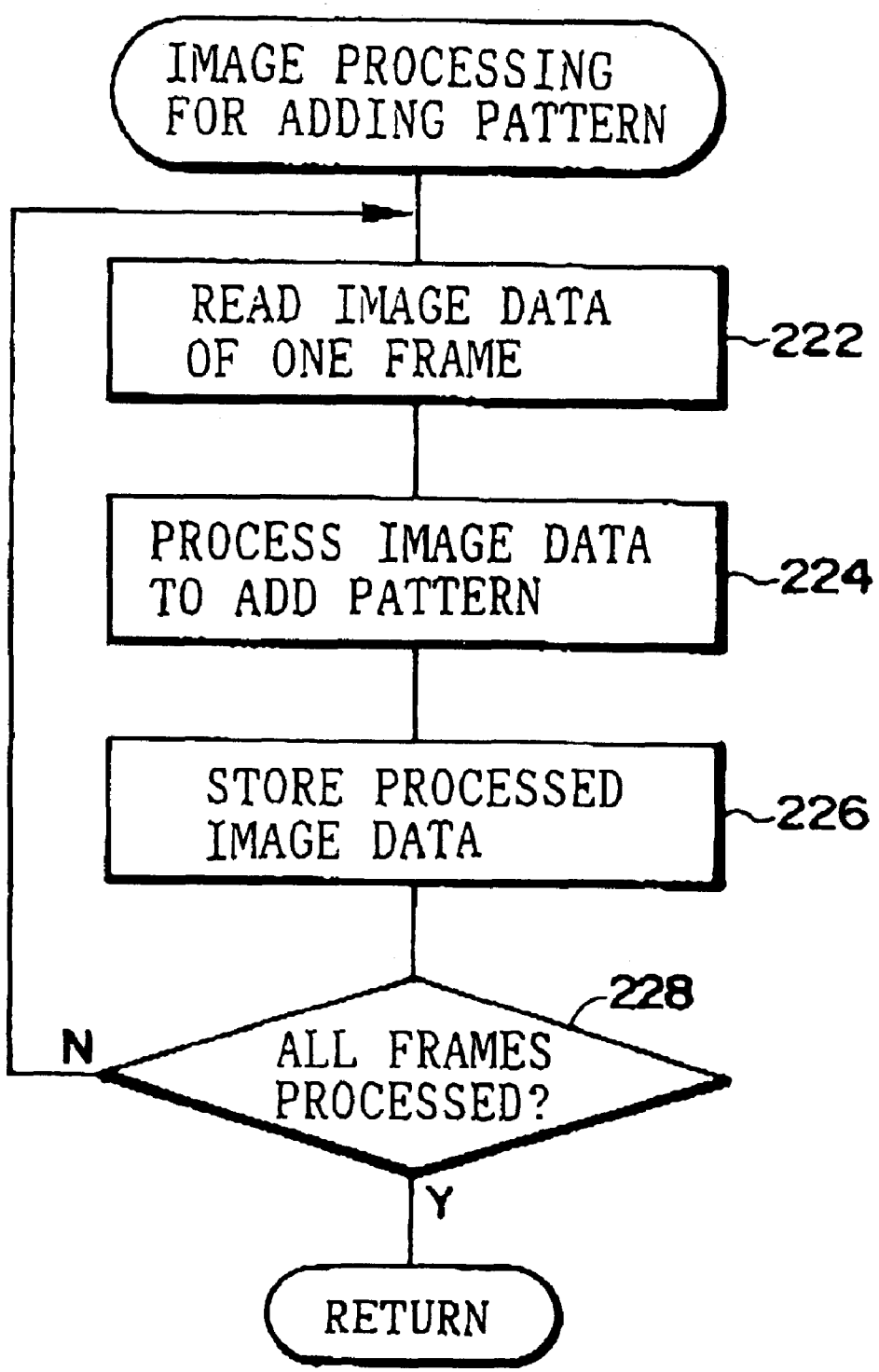
FIG. 10 is a flow chart showing a subroutine of image processing for applying a pattern.

When the processings are completed with respect to all the frames of the negative film N, the routine returns to the main routine of FIG. 8. A subroutine shown in FIG. 10 is executed in the image processing of the next step 220 in the main routine of FIG. 8.

in step 222 of FIG. 10, the digital image data of one frame stored in the image memory 102 is read. In the next step 224, the read digital image data is processed to provide the following patterns. Here, as shown in FIG. 7A, digital image data, to which a cyan pattern 87C, a magenta pattern 87M, a yellow pattern 87Y and a gray pattern 87G having predetermined saturations and brightnesses are applied outside of the image recording region of the original image, is formed. Then, in the next step 226, the digital image data to which the patterns have been added as mentioned above (hereinafter called processed image data in order to differentiate the processed image data from unprocessed image data) is stored in the image memory 102.

Thereafter, the above processings of steps 222 to 226 are executed with respect to the digital image data of each frame stored in the image memory 102. Thus, the digital image data of the respective frames are sequentially read frame-by-frame, the above patterns are added to the digital image data of each frame image, are the digital image data to which patterns have been added (processed image data) are sequentially stored in the image memory 102.

Then, when the processings are completed with respect to the digital image data of all the frames, the routine returns to the main routine of FIG. 8. The subroutine shown in FIG. 11 is executed in the print processing in the next step 240 of the main routine of FIG. 8.

Figure 11:
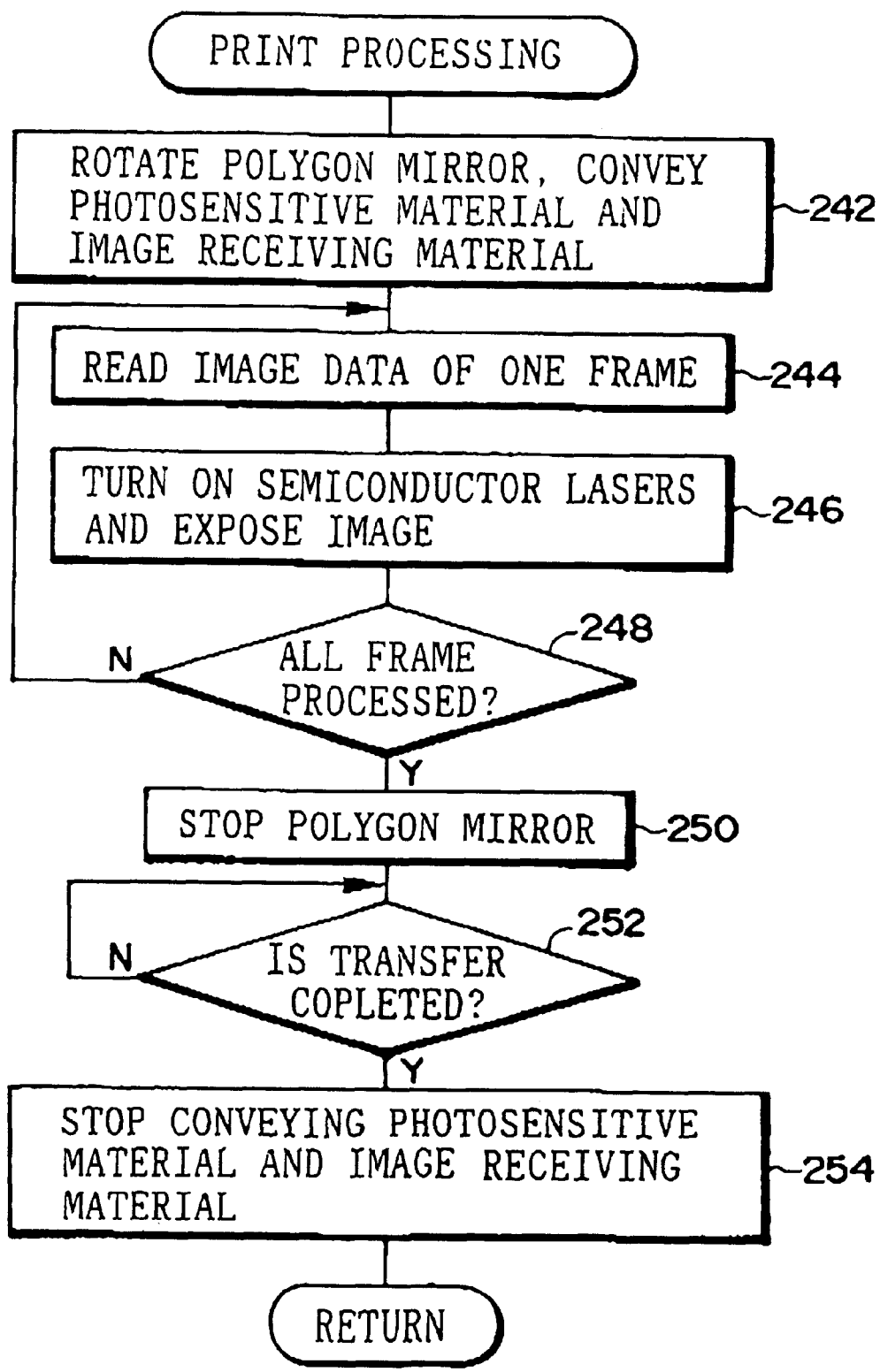
FIG. 11 is a flow chart showing a subroutine of print processing.

In step 242 of FIG. 11, the polygon mirror 264 is rotated in the exposure device 38 shown in FIG. 5, and the photosensitive material 16 and the image receiving material 108 are conveyed in the image recording device 10 shown in FIG. 2. In the next step 244, the processed image data of one frame stored in the image memory 102 is read. In the next step 246, a laser beam is emitted from each of the semiconductor lasers 258Y, 258M, 258C to expose an image based on the processed image data.

In FIG. 2, the photosensitive material 16 conveyed along the predetermined conveying path by the conveying rollers 19, 21, 23 reaches the exposure section 22. In this exposure section 22, the laser beams from the above semiconductor lasers 258Y, 258M, 258C are irradiated onto the photosensitive material 16 so that the image based on the processed image data is exposed.

Thereafter, the photosensitive material 16 is sent into the switch back portion 40, and then sent into the water coating section 62 by reversely rotating the conveying roller 26. In the water coating section 62, the photosensitive material 16 is coated with water. While the excess water is being removed from the photosensitive material 16 by a squeeze roller 68, the photosensitive material 16 passes through the water coating section 62 and is sent to the thermal developing transfer section 104.

An exposure of the photosensitive material 16 is started, nip roller 110 is driven by control of the controller 100 so that the image receiving material 108 is pulled out of the receiving material magazine 106. When the image receiving material 108 is pulled out of the receiving material magazine 106 by a predetermined length, the cutter 112 is operated so that the image receiving material 108 is cut to a predetermined length. After the cutter 112 is operated, the image receiving material 108 is conveyed by conveying rollers 190, 186, 114 while being guided by the guide plate 182. The image receiving material 108 then is sent in a standby state just before the thermal developing transfer section 104.

When it is detected in the thermal developing transfer section 104 that the photosensitive material 16 has been sent by the squeeze roller 68 into the space between the outer circumference of the heating drum 116 and the laminating roller 120, the conveying of the image receiving material 108 is restarted so that the image receiving material 108 is sent to the laminating roller 120, and the heating drum 116 is operated.

In this case, the guide plate 122 is provided between this laminating roller 120 and the squeeze roller 68 of the water coating section 62, so that the photosensitive material 16 sent from the squeeze roller 68 is reliably guided to the laminating roller 120.

The photosensitive material 16 and the image receiving material 108 which are superposed one on top of the other by the laminating roller 120 are nipped between the heating drum 116 and the endless press contact belt 118 in this superposed state, and are conveyed in the counterclockwise direction in FIG. 1 around an approximately ⅔ of the circumference of the heating drum 116 (between the winding rollers 134 and 140). Thus, the photosensitive material 16 and the image receiving material 108 are heated so that mobile dyes are released. The dyes transferred to the dye fixing layer of the image receiving material 108 so that an image is recorded on the image receiving material 108.

Thereafter, when the photosensitive material 16 and the image receiving material 108 are conveyed in this nipped state and reach a lower portion of the heating drum 116, the separating claw 154 is moved by the cam 130 such that the separating claw 154 approaches the heating drum 116. The separating claw 154 engages the leading end portion of the photosensitive material 16 which is being conveyed in a state of preceding the image receiving material 108 by a predetermined length. The leading end portion of the photosensitive material 16 is thereby separated from the outer circumference of the heating drum 116. Further, a pinch roller 157 (see FIG. 3) presses against the photosensitive material 16 due to the return movement of the separating claw 154. Thus, the photosensitive material 16 is trained about the bending/guiding roller 142 and is moved downward. Further, the photosensitive material 16 is conveyed to the waste photosensitive material accommodating box 178 by the conveying rollers 158, 162, 160.

The image receiving material 108 is separated from the photosensitive material 16 and is moved while remaining in close contact with the heating drum 116. The image receiving material 108 is sent to the separating roller 174 and is separated from the outer circumference of the heating drum 116 by the separating claw 176.

The image receiving material 108 is moved downward while being trained about the separating roller 174. Further, while the image receiving material 108 is guided by the receiving material guide 170, the image receiving material 108 is conveyed by the receiving material discharging rollers 172, 173, 175 and is discharged into the tray 177.

Thus, after the image based on the processed image data is exposed onto the photosensitive material 16, the image is thermally transferred to the image receiving material 108. Then, the image receiving material 108 on which the image based on the processed image data is recorded is discharged into the tray 177 as a completed photograph print.

Thereafter, the above processings of steps 244 to 246 are executed with respect to the processed image data of each frame stored to the image memory 102. Thus, the processed image data of each frame are sequentially read frame-by-frame, and images based on the processed image data are exposed so that photograph prints on which these images are recorded are made by thermal transfer.

When the exposure processing is completed with respect to the digital image data of all the frames, the routine proceeds to step 250. In this step 250, the rotation of the polygon mirror 264 is stopped. Thereafter, the photosensitive material 16 and the image receiving material 108 are continuously conveyed and the thermal transfer processing is performed until thermal transfer of the images of all the frames is completed in the image recording device 10. When thermal transfer of all the frame images has been completed, the routine proceeds to step 254. In this step 254, the conveying of the photosensitive material 16 and the image receiving material 108 is stopped, and the processings are terminated.

As shown in FIG. 7A, a photograph print 86, on which the cyan pattern 87C, the magenta pattern 87M, the yellow pattern 87Y and the gray pattern 87G having predetermined saturations and brightnesses are recorded outside the image recording region, is made by the above patterned photograph print making processing.

Figure 7B:
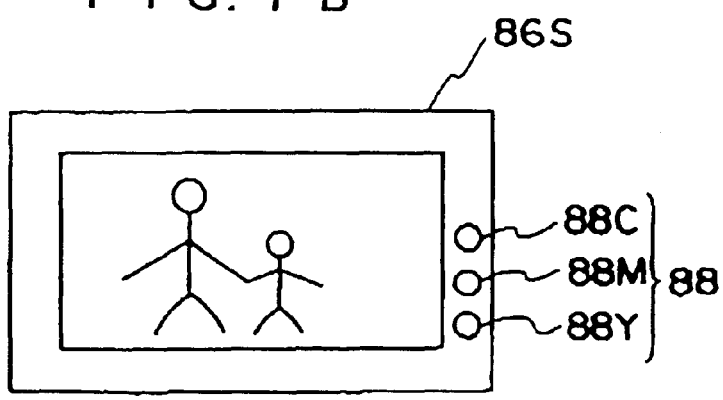
FIG. 7B is a view showing a photograph print to which a three-color patch has been applied.
Figure 7C:
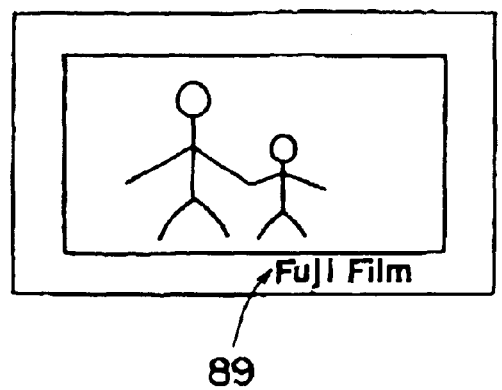
FIG. 7C is a view showing a photograph print to which a gray characters have been applied.

The patterned phonograph print is not limited to the patterned photograph print to which the four-color pattern is applied as shown in FIG. 7A. For example, the patterned photograph print may be a patterned photograph print to which are applied three color patterns (a three-color patch) which are of a cyan pattern 88C, a magenta pattern 88M and a yellow pattern 88Y having predetermined saturations and brightnesses as shown in FIG. 7B. Further, the patterned photograph print may be a patterned photograph print to which a gray characters 89 having a predetermined brightness are applied as shown in FIG. 7C.

Figure 12:
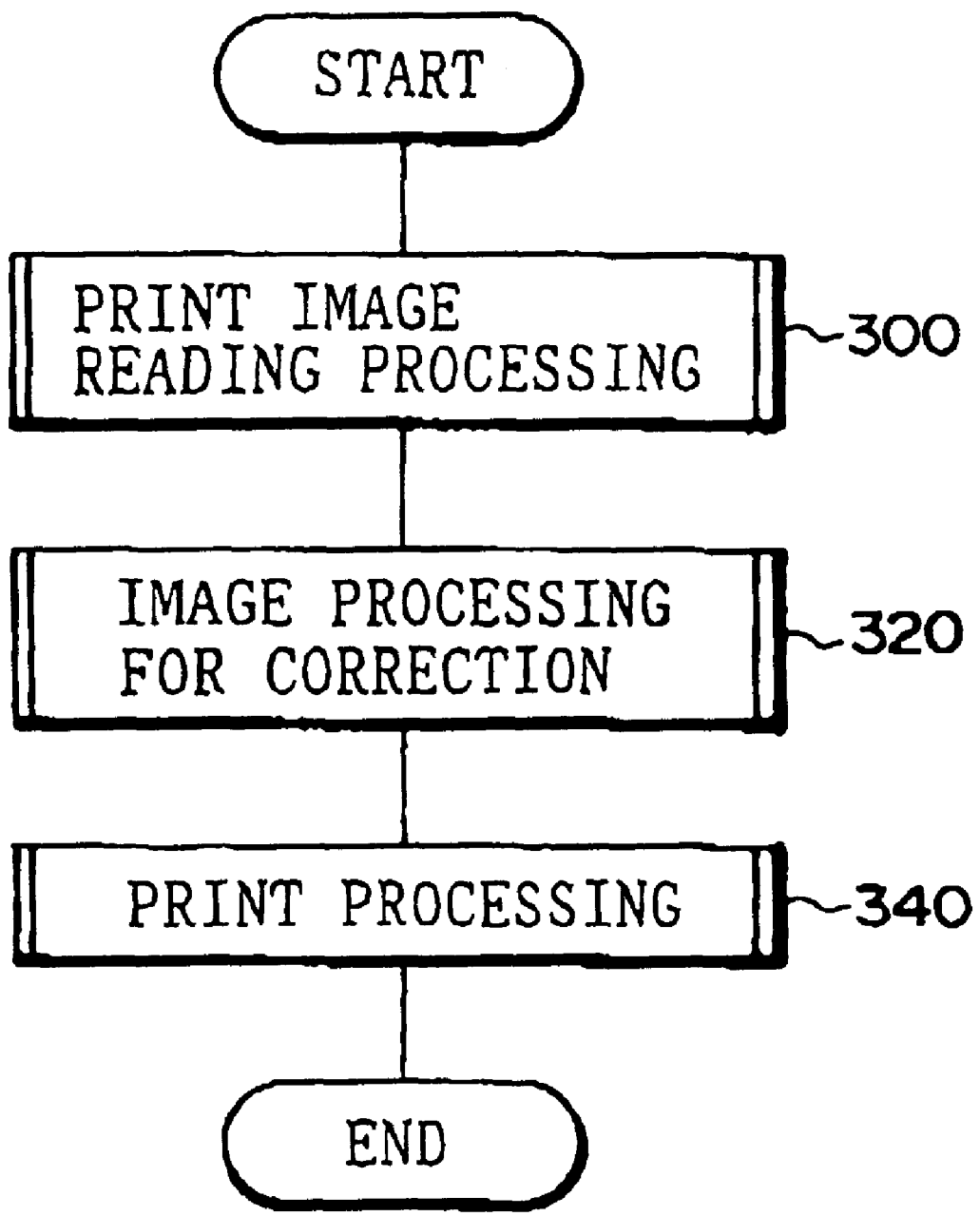
FIG. 12 is a flow chart showing a control routine of fading correction processing in the first embodiment.

Next, the fading correction processing will be explained by using FIGS. 12 to 14. As shown in FIG. 12, the fading correction processing is mainly formed by the following three processings which are reading processing, image processing and print processing. First, in step 300, the print image of a faded photograph print is read and digital image data is obtained in the reading processing. In the next step 320, digital image data in which the amount of fading is corrected for the read print image (hereinafter called corrected image data) is made in the image processing. Finally, in step 340, a photograph print, on which an image based on the above made corrected image data is recorded, is made in the print processing. The fading correction processing of FIG. 12 begins to be executed by the control section 100 by an operator giving a predetermined starting command by means of the operating section 103 after the operator sets the photograph print R, which is the object of correction, at a predetermined position of the placement stand 73 in the image scan reading section 70 as shown in FIG. 6.

The respective processings will next be explained in detail.

Figure 13:
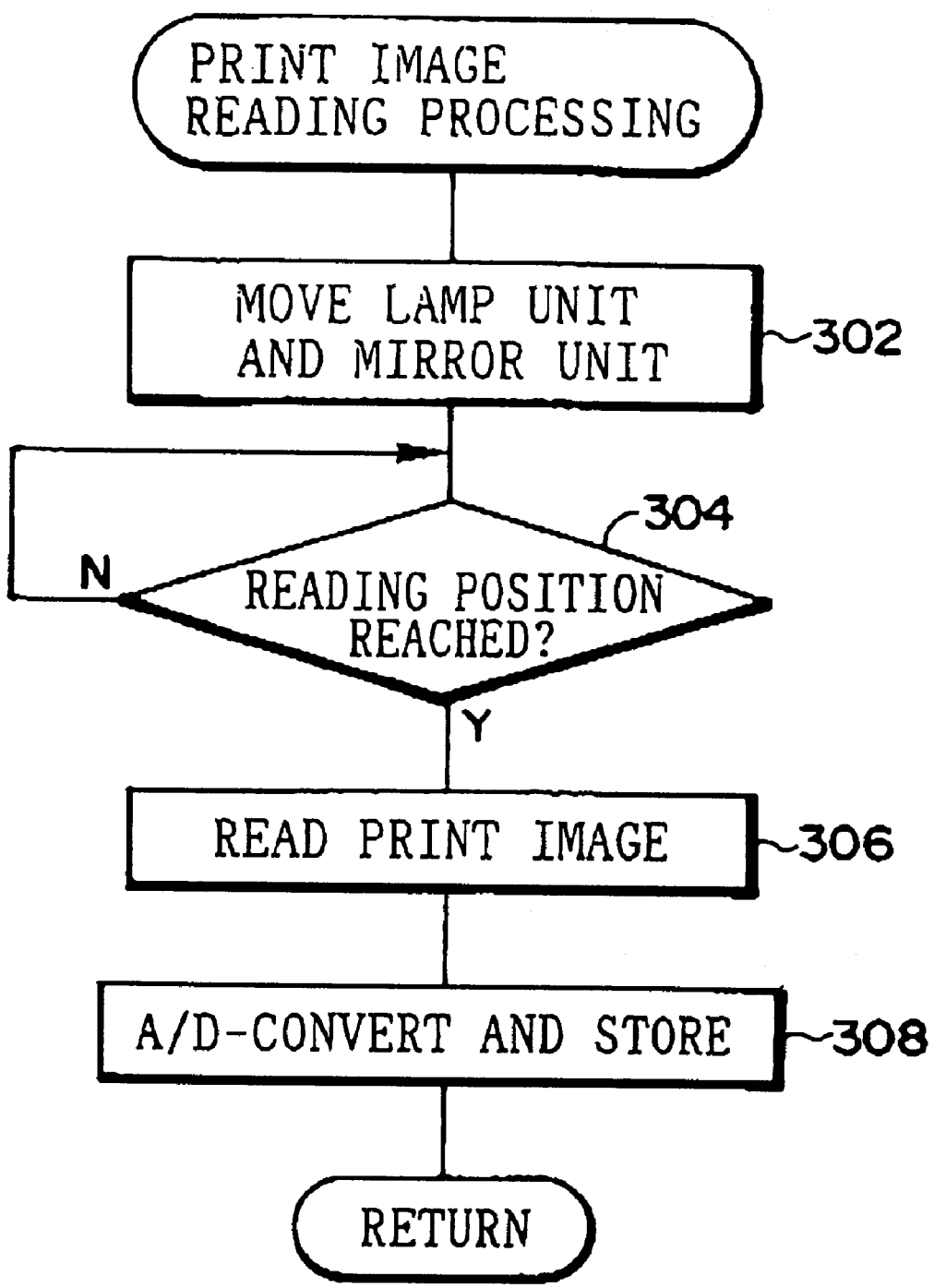
FIG. 13 is a flow chart shoving a subroutine of reading processing of a print image.

A subroutine shown in FIG. 13 is executed in the print image reading processing of step 300 of FIG. 12. In steps 302 and 304 of FIG. 13, the lamp unit 72 and the mirror unit 78 are moved in the image scan reading section 70 of FIG. 6, and are respectively set to initial reading positions for reading the print image of the faded photograph print R.

When the lamp unit 72 and the mirror unit 78 are set to the respective initial reading positions, in step 306, the light source 74 is turned on and the lamp unit 72 and the mirror unit 78 are moved, and reflected light from the photograph print R is continuously detected by the CCD line sensor 85 so that the image of the photograph print R is scanned and read.

In the next step 308, the image read by the CCD line sensor 85 is A/D-converted, and the converted digital image data is stored in the image memory 102. Then, the routine is returned to the main routine of FIG. 12. The subroutine shown in FIG. 14 is executed in the image processing in the next step 320 of the main routine of FIG. 12.

Figure 14:
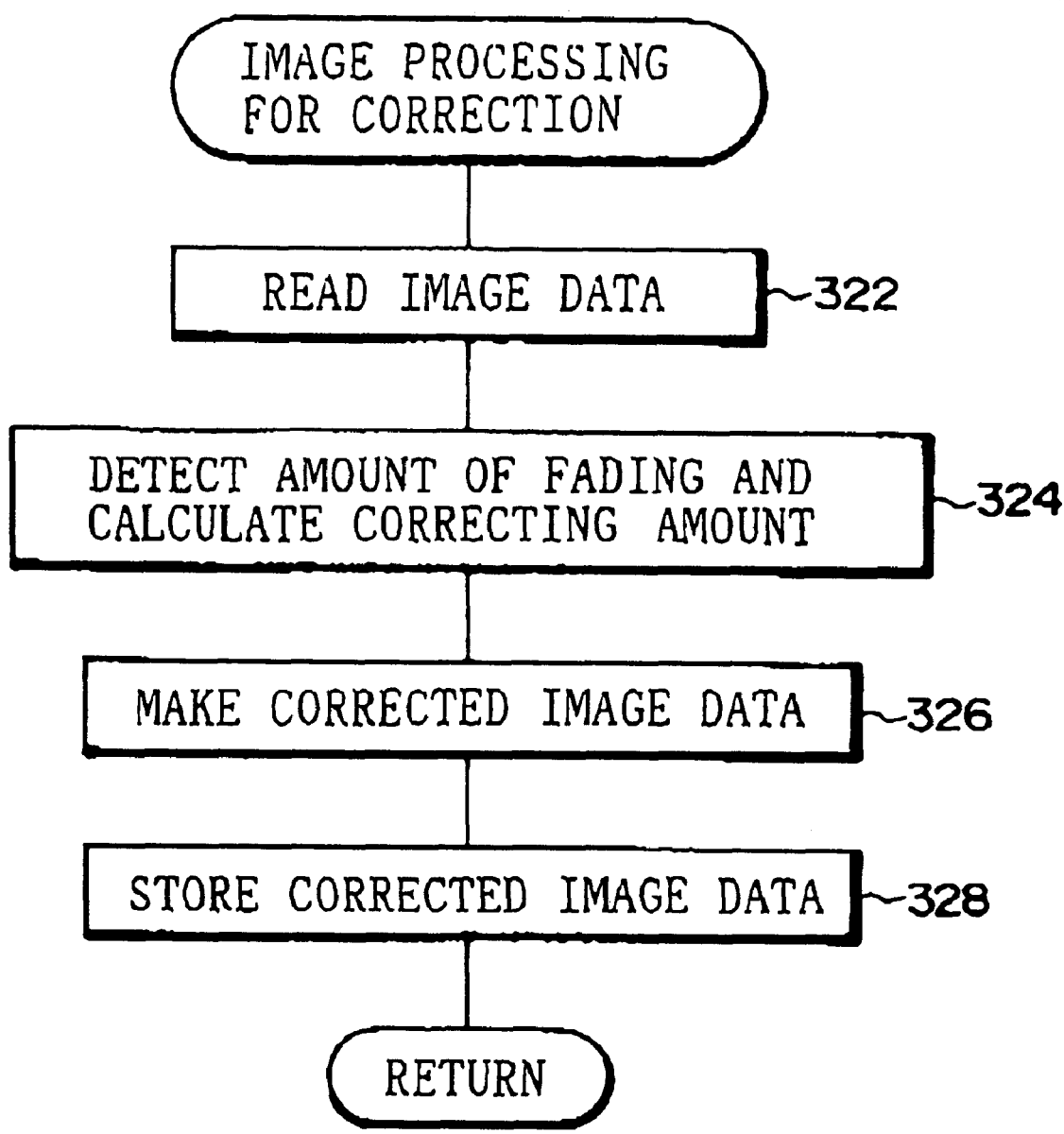
FIG. 14 is a flow chart showing a subroutine of image processing for correction.

In step 322 of FIG. 14, the digital image data of the faded photograph print R stored in the image memory 102 is read. In the next step 324, a amount of fading of the digital image data is detected and a correcting amount therefor is calculated as follows.

A correcting amount of the saturation of a cyan color component is determined by measuring the saturation of the cyan pattern 87C shown in FIG. 7A and calculating the difference between this measured saturation and saturation at the time of initial setting. Similarly, correcting amounts of the saturations of magenta and yellow color components are determined by measuring saturations the magenta pattern 87M and the yellow pattern 87Y and calculating the differences between these measured saturations and the saturations at time of initial setting. Further, a correcting amount of the brightness of the gray pattern 87G is determined by measuring the brightness of the gray pattern 87G and calculating the difference between this measured brightness and the brightness at the time of initial setting.

In the next step 326, corrected digital image data (corrected image data) is made by correcting the digital image data of the faded photograph print R on the basis of the above calculated correcting amounts of the saturations of the cyan, magenta and yellow color components, and the above calculated correcting amount of the brightness. An image based on these made corrected image data may be displayed on a display of the operating section 103 so that the operator can confirm the corrected image.

In the next step 328, the made corrected image data are stored in the image memory 102, and the routine returns to the main routine of FIG. 8.

In the print processing in the next step 340 in the main routine of FIG. 12, the above-mentioned print processing of FIG. 11 is executed with the corrected image data made in the image processing in the above step 320 as an object. The processes of the print processing are similar to those of the above case. Accordingly, an explanation of these processes is omitted here.

A new photograph print, on which an image based on the corrected image data is recorded, can be made by the print processing using the corrected image data as an object in step 340 of FIG. 12.

Thus, the saturation and the image density of each of the cyan, magenta and yellow colors can be suitably corrected by correcting an image on the basis of the amount of fading of a pattern of the photograph print on which the faded image is recorded.

Further, since the amount of fading is not judged by the visual sense of a person as in the conventional case, no variation in accuracy of the fading correction is caused, and image quality can be stabilized to a constant level.

In the above first embodiment, an image based on the corrected image data is recorded on a photograph print by using an image recording device such as that shown in FIG. 2 which makes photograph prints by thermal transfer processing. However, an image recorder 10S, which is shown in FIG. 18 and makes photograph prints by exposure and wet type processing as described below, may be used.

Figure 18:
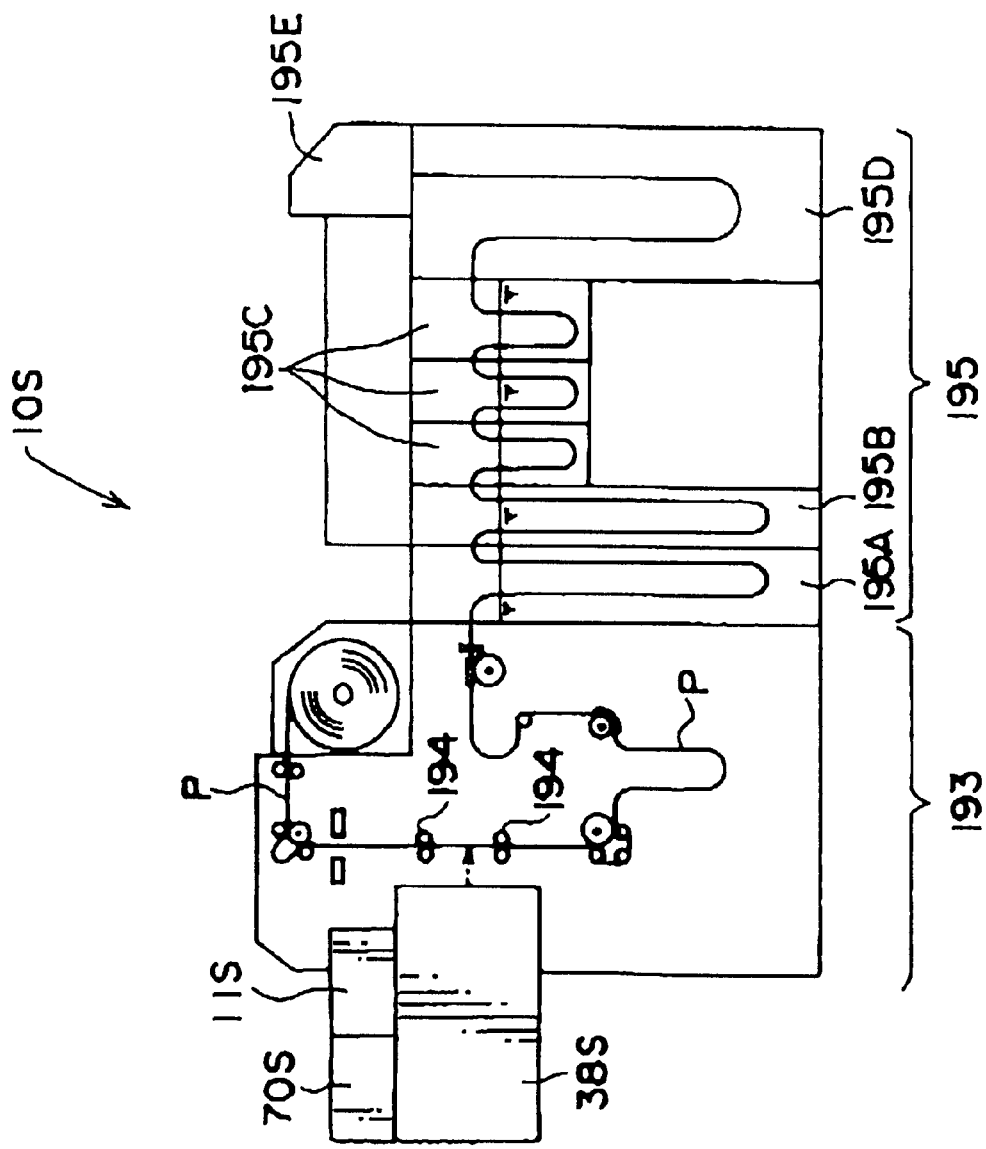
FIG. 18 is a schematic structural view showing the structure of another image recording device which can be used as the image recording device in the first embodiment.

The image recorder 10S of FIG. 18 has a frame image reading section 11S, an image scan reading section 70S and an exposure device 38S having structures respectively similar to the above-described structures. Further, the image recorder 10S has an exposure section 193 in which exposed photographic paper P is conveyed, and also has a developing processing section 195 for performing the wet type processing. The developing processing section 195 is formed by a color developing processing tank 195A for storing a color developing processing solution, a bleaching-fixing processing tank 195B for storing a bleaching-fixing processing solution, rinse processing tanks 195C for storing a washing processing solution, a drying section 195D for performing dry-processing by warm air or the like, and a cutting section 195E for cutting the photographic paper P per frame.

In the above exposure section 193, a light beam based on corrected image data from the exposure device 38S is irradiated to the color paper P which is being conveyed along a predetermined conveying path, so that a corrected image is exposed. The exposed photographic paper P is then sequentially conveyed through the color developing processing tank 195A, the bleaching-fixing processing tank 195B and plural rinse processing tank 195C in the developing processing section 195. Thus, the photographic paper P is sequentially developed, fixed and washed, and is dried by the warm air or the like in the drying section 195D. Further, the color paper P is cut per frame in the cutting section 195E so that a photograph prints on which corrected images are recorded are completed.

Second Embodiment

A second embodiment of the present invention will next be explained. This second embodiment corresponds to the invention of claim 7. Here, an embodiment for making a patterned photograph print by conventional analog exposure will be explained.

Figure 15:
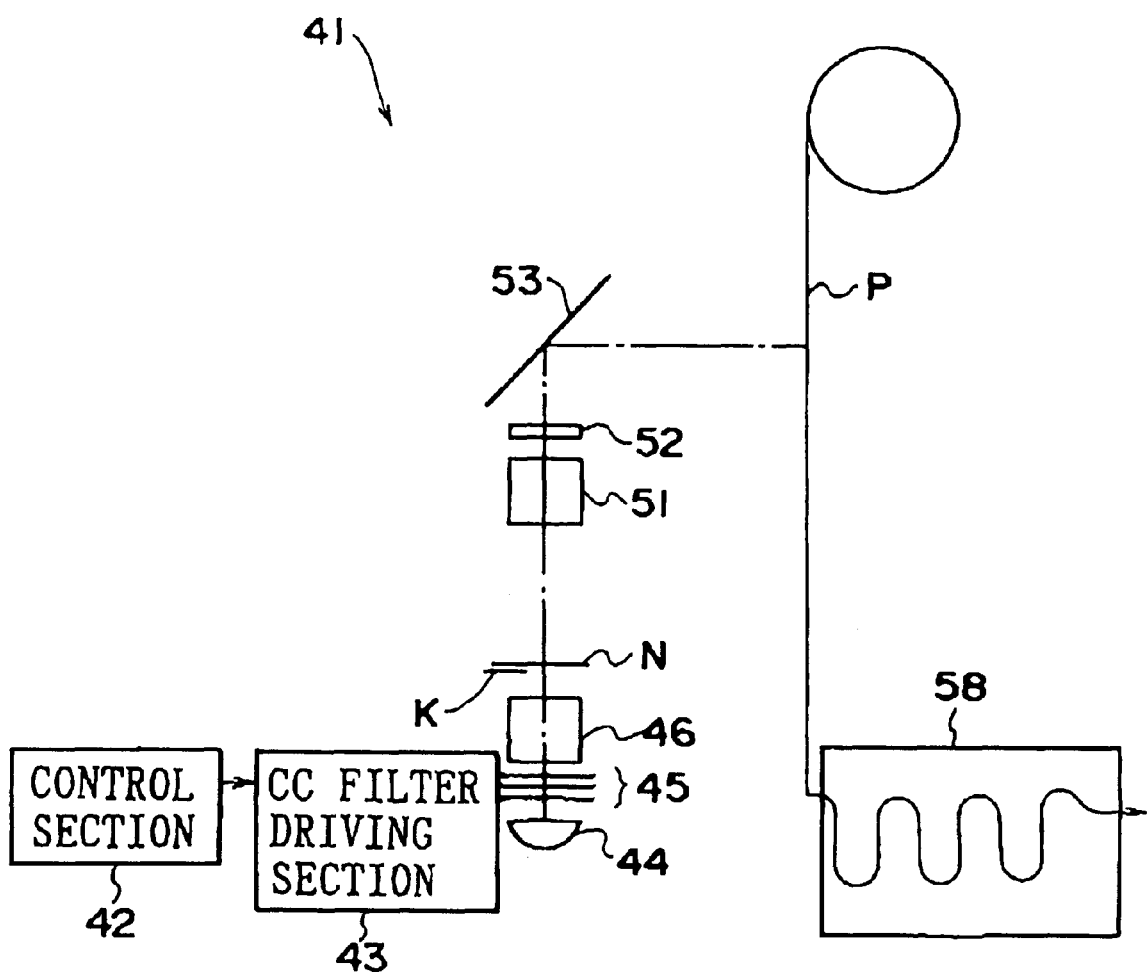
FIG. 15 is a schematic block diagram of a printer for making a patterned photograph print in a second embodiment.

In this second embodiment, the patterned photograph print is made by a printer 41 shown in FIG. 15. The structure of this printer 41 will next be explained.

As shown in FIG. 15, the printer 41 has a light source 44 and a color-correction filter (hereinafter called a CC filter) 45. The light source 44 is formed by a halogen lamp or the like and emits exposure light. The CC filter 45 is formed by three sets of filters which are cyan, magenta and yellow filters arranged such that they can be inserted on and withdrawn from an exposure optical path. A CC filter driving section 43 for inserting and withdrawing each of the filters of the CC filter 45 onto and from the exposure optical path is connected to the CC filter 45.

A diffusing box 46 is provided on the exposure optical path, at a downstream side of the CC filter 45. The printing position of a frame image of a negative film N is located at a downstream side of the diffusing box 46. The negative film N is conveyed in a direction or thogonal to the surface of FIG. 15.

As shown in FIG. 17A and FIG. 17B, which is a cross-sectional view taken along line T—T in FIG. 17A, a negative film X is disposed at the printing position of an image of the negative film N such that the negative film N is overlapped on the negative film K with a slight space there between. A cyan pattern 59C, a magenta pattern 59M, a yellow pattern 59Y and a gray pattern 59G having predetermined saturations and brightnesses are recorded on this negative film K. These patterns are located at a position which is not overlapped by an image frame 57 of the negative film N in a printing exposure range W as shown in FIG. 17A. Namely, the image of the image frame 57 and the above four color patterns are simultaneously exposed at the time of exposure of the image frame 57 of the negative film N.

As shown in FIG. 15, an exposure lens 51 for changing the magnification of an exposed image and a black shutter 52 for blocking the exposure light are sequentially arranged at a downstream side of the printing position of the negative film N. A mirror 53 for reflecting the exposure light in a substantially perpendicular direction is provided at a downstream side of the black shutter 52. The exposure light reflected by the mirror 53 is irradiated onto the color paper P so that the color paper P is exposed.

A control section 42 is provided in the printer 41. The control section 42 includes a microcomputer and monitors and controls the overall processing of the printer 41. The above CC filter driving section 43 and an unillustrated conveying driving section for conveying and moving the negative film N and the color paper P are connected to this control section 42, so that the operations of these machines can be monitored and controlled.

A processor section 58 is provided at a conveying direction downstream side of the photographic paper P. The processor section 58 is used to develop, fix, wash and dry the exposed photographic paper P. The processor section 58 has a color developing processing tank for storing a color developing processing solution, a bleaching fixing-processing tank for storing a bleaching-fixing processing solution, plural rinse processing tanks for storing a washing processing solution, a drying section for drying the photographic paper P by warm air or the like, and a cutting section for cutting the photographic paper P per image frame. These tanks and the cutting section are sequentially arranged along the conveying direction of the photographic paper P.

Processing for making a patterned photograph print will next be explained as an operation of the second embodiment by using FIG. 16.

A leading end portion of the negative film N is set at a predetermined position. Thereafter, when an unillustrated start button of the printer 41 is operated by an operator, the control routine shown in FIG. 16 begins to be executed by the control section 42.

Figure 16:
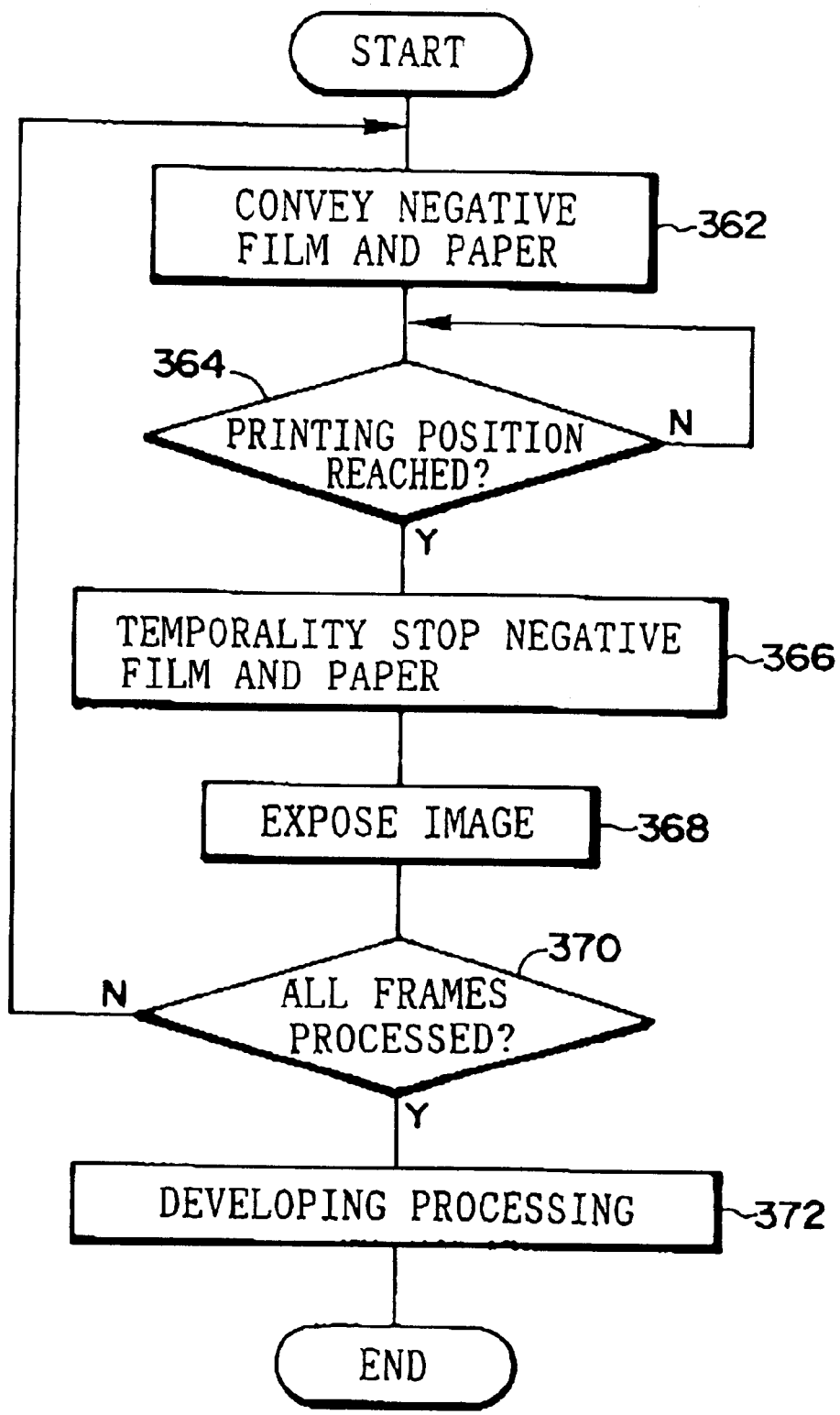
FIG. 16 is a flow chart showing a control routine of processing for making the patterned photograph print in the second embodiment.

In step 362 of FIG. 16, the negative film N and the photographic paper P are conveyed and are respectively moved along predetermined paths. In the next step 364, it is monitored whether a frame (first, a first frame) of the negative film N has reached a printing position corresponding to the printing exposure range W of FIG. 17A.

When a frame of the negative film N reaches the printing position, the routine proceeds to step 366. In this step 366, the conveying of each of the negative film N and the photographic paper P is temporarily stopped, and the frame of the negative film N is positioned at the printing position. In the next step 368, the light source 44 is turned on and the black shutter 52 is opened. Thus, an image of the frame set at the printing position and the four color patterns 59 (see FIG. 17A) recorded on the negative film K in advance are exposed onto the photographic paper P.

In the next step 370, it is judged whether exposure is completed with respect to all frames of the negative film N. When an unexposed frame remains, the routine returns to step 362, and the negative film N is conveyed to set the next frame of the negative film N at the printing position. Further, the photographic paper P is conveyed by one frame to prepare this photographic paper for the next exposure. At this time, the negative film K is not moved. Therefore, when the next frame of the negative frame N is set at the printing position, the image of the next frame and the patterns 59 are located in the printing exposure range W as shown in FIG. 17A. In steps 364 to 368, the next frame image and the patterns 59 are exposed onto the photographic paper P.

The above processings in steps 362 to 368 are carried out for each of the frames of the negative film N so that each of the frame images are exposed onto the color paper P together with the patterns 59.

When the exposure is completed with respect to all the frames of the negative film N, the routine proceeds to step 372. In this step 372, the color paper P on which the images of the respective frames are exposed is sequentially conveyed to the color developing processing tank, the bleaching-fixing processing tank and the plural rinse processing tank within the processor 58. Thus, the respective predetermined processings of development, fixing and washing are performed on the color paper P. The color paper P is then dried by the drying section. Thereafter, the color paper P is cut per frame in the cutting section. Thus, photograph prints in which the patterns 59 are recorded outside the image recording regions are completed.

Thus, the patterned photograph print can be made by the conventional analog exposure.

The frame image and the patterns are simultaneously exposed onto the photographic paper P in the above method for making the patterned photograph print by the analog exposure in the second embodiment. However, the frame image and the patterns can be separately exposed onto the photographic paper P by suitably masking the exposure range of the photographic paper P.

The printer in the above second embodiment desirably has a calibration function so that the patterns can be printed at precise densities.

Third Embodiment

A third embodiment of the present invention will next be explained. This third embodiment corresponds to the invention of claim 8. The following structure will be explained here. A pattern is recorded on a negative film by a camera at the time of photographing. An image and the pattern which have faded and deteriorated to the same extent are exposed onto the same photographic paper so that a print image is made. Digital image data is corrected on the basis of the amount of fading of the pattern, among the image and the pattern which have faded and deteriorated to the same extent, such that a fading correction amount of the image is provided.

Figure 19:
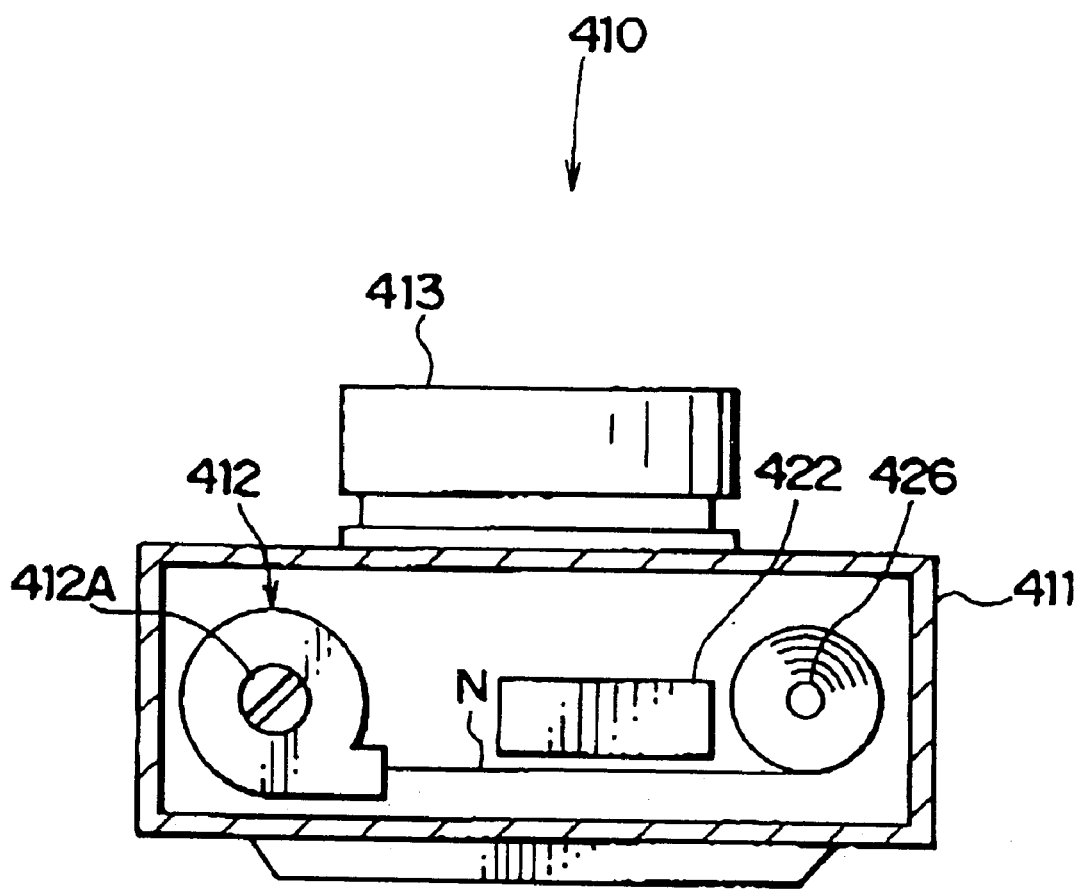
FIG. 19 is a view showing a state in which a negative film is loaded in a camera in third and fourth embodiments.

In this third embodiment, a four-color patch 424 of cyan, magenta, yellow and gray colors having predetermined saturations and brightnesses set at the time of photographing is recorded onto the negative film N by a camera 410 shown in FIGS. 19 and 20. The structure of this camera 410 will be explained hereinafter.

FIG. 19 is a perspective view of the camera 410 as seen from above. As shown in FIG. 19, a cartridge 412 is set within a casing 411. The negative film N is pulled out of this cartridge 412 and is conveyed along a surface of the casing (the lower surface in FIG. 19) at the side opposite a lens 413. The negative film N is taken up by a take-up reel 426 disposed at an end portion of the casing (the right side end portion in FIG. 19) at the side opposite to the cartridge 412 within the casing 411. An exposure section 422 for writing the four-color patch 424 is adjacent to a conveying path of the above negative film N.

As shown in FIG. 20, a write control section 420 is provided in the camera 410. The write control section 420 includes a microcomputer and controls processing for writing the four-color patch 424 onto the negative film N. This write control section 420 controls operations of the exposure section 422 and driving shafts 416 and 426A. The driving shaft 416 rotates a spool 412A of the cartridge 412. The driving shaft 426A rotates a the take-up reel 426. The conveying of the negative film N and a writing operation using the exposure section 422 are carried out synchronously with each other by the write control section 420. Further, the write control section 420 is structured such that it can recogniz that the shutter 428 has been operated and photographing has been instructed given.

The negative film N on which images have been photographed by the above camera 410 is developed by an unillustrated developing device. Each frame image of the developed negative film N is printed by the image recording device 10 (see FIGS. 1 and 2) having the same structure as the first embodiment. Explanations of the structures of the above developing device and the image recording device 10 are omitted here.

Operation of the third embodiment will next be explained. Here, explanations will be sequentially given with respect to four-color patch writing processing for writing a four-color patch near each of the frames of the negative film by the camera 410 at the time photographing, processing for digitally reading each frame image of the faded negative film and exposing the frame images onto a photographic paper and making color prints, and processing for correcting a faded print image and newly exposing this print image onto another color paper and making a color print.

First, the four-color patch writing processing for writing the four-color patch 424 onto each of the frames by the camera 410 shown in FIGS. 19 and 20 at the time of photographing will be explained.

A photographer places the cartridge 412 in a predetermined position of the camera 410. Thereafter, when the photographer releases an unillustrated photographing lock button to set the camera 410 in a state in which photographing is possible, the control routine shown in FIG. 21 begins to be executed by the write control section 420.

Figure 21:
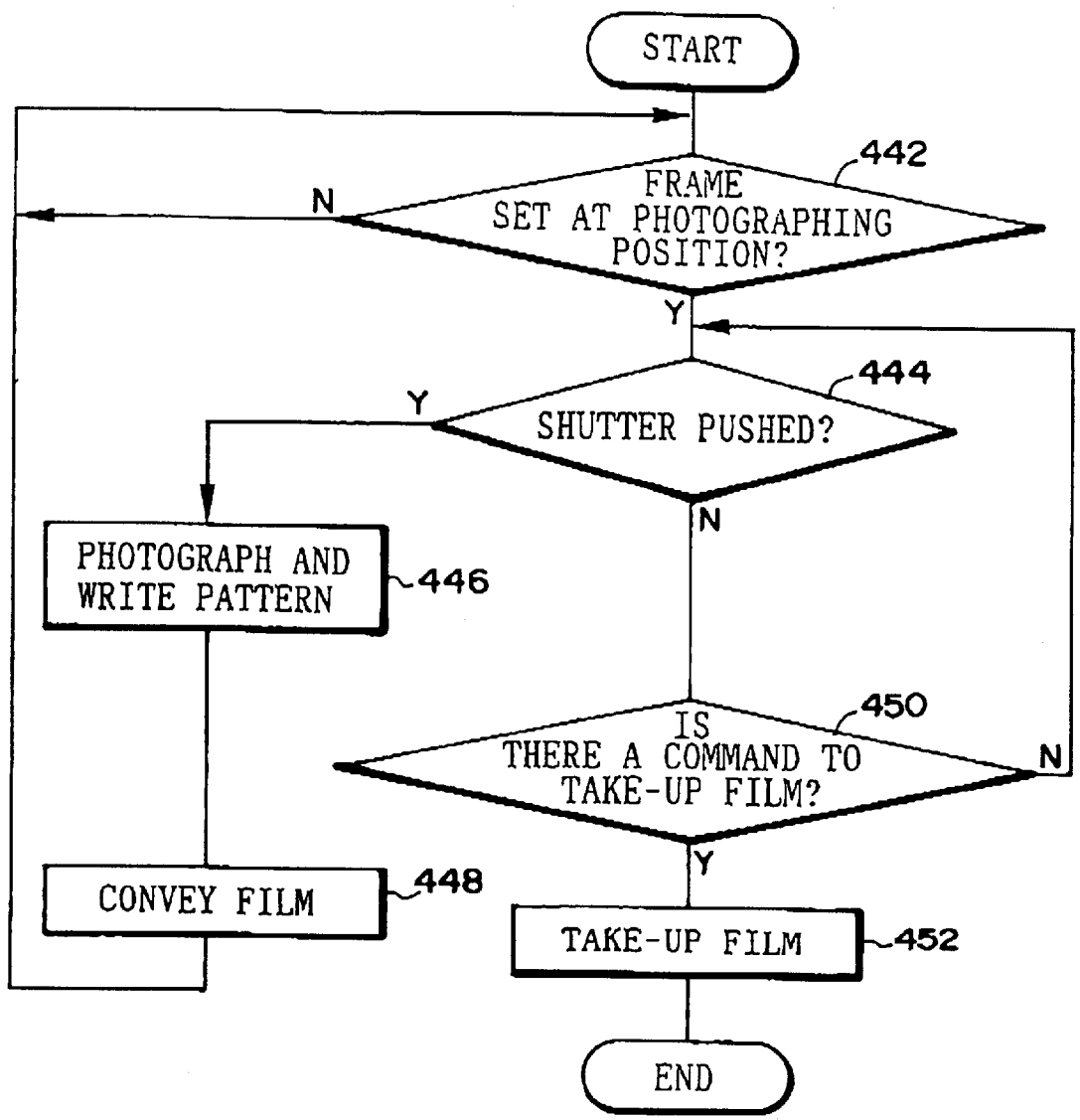
FIG. 21 is a flow chart shoving a control routine executed by a write control section within the camera in the third and fourth embodiments.

When a frame of the negative film N is set at a predetermined photographing position and the shutter 428 is pushed (i.e., when an affirmative judgment is mead in steps 442 and 444), in the control routine of FIG. 21, a normal photographing operation is performed and the four-color patch 424 is written onto a predetermined position of the negative film N in correspondence with the frame 430 by the exposure section 422 (step 446). Then, the negative film N is conveyed to set the next frame at the photographing position (step 448). Thus, the photographing operation is performed for each frame, and the writing processing of the four-color patches 424 is performed.

Thereafter, when a take-up command is given (i.e., when an affirmative judgment is made in step 450), the driving shaft 416 is rotated in a direction opposite to that at the time of conveying the negative film N so that the spool 412A is rotated in a take-up direction and the negative film N is take up (step 452). The four-color patch 424 is written for each frame photographed on the negative film N by the above four-color patch writing processing.

Figure 22:
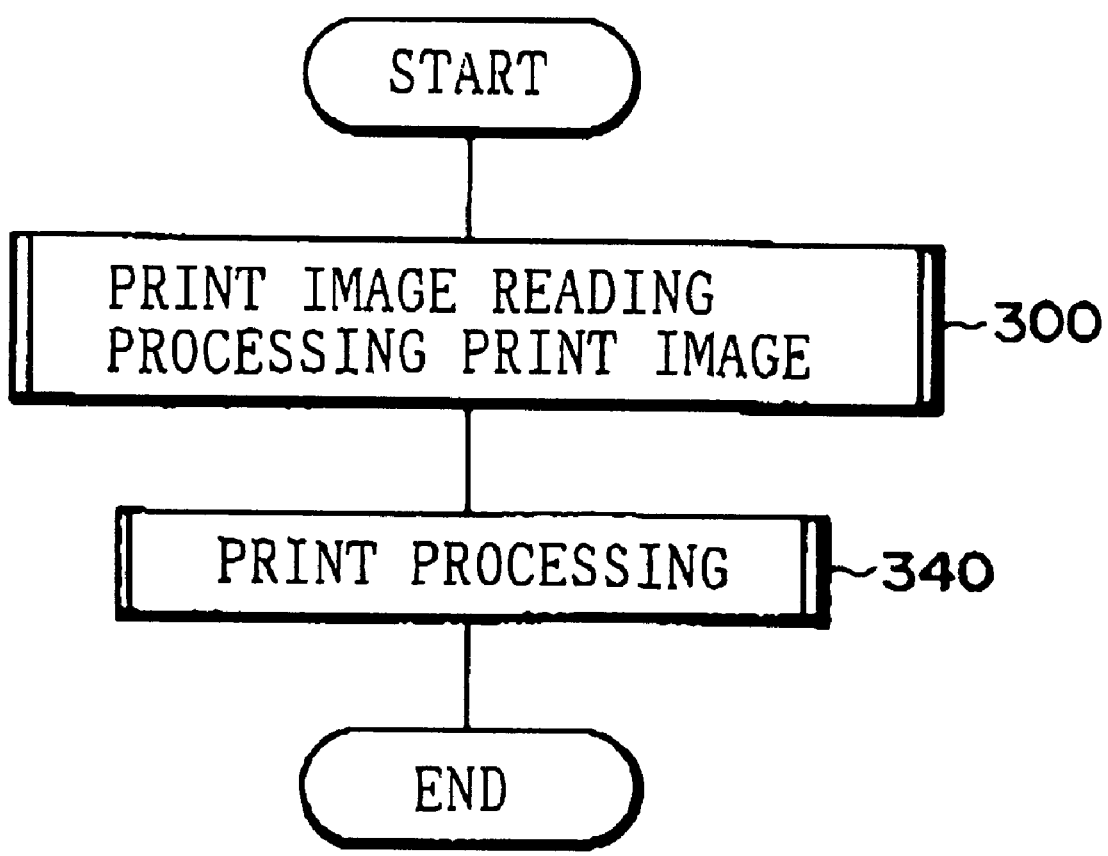
FIG. 22 is a flow chart showing a control routine of processing in which respective frame images of the negative film are digitally read and are exposed onto a photographic paper in the third embodiment.

Next, the processing for digitally reading each frame image of the faded negative film and exposing the frame images onto a photographic paper and making color prints will be explained. In this processing, as shown in FIG. 22, the subroutine (see FIG. 13) of the reading processing of the above-described print image is executed in step 300 so that each faded frame image is digitally read and stored. In the next step 340, the subroutine (see FIG. 11) of the print processing is executed on the basis of the above-described stored digital image data of each frame. At this time, each frame image faded due to deterioration of the negative film N over time is printed.

Finally, the processing for correcting the faded print image and newly exposing this print image onto another photographic paper and making a color print will be explained. In this processing, as shown in FIG. 12, the subroutine (see FIG. 13) of the reading processing of the above-described print image is executed in step 300 so that each faded frame image is digitally read and stored. The read digital image data includes both an amount of fading caused by the deterioration of the negative film N over time and an amount of fading caused by deterioration of the color paper P over time. Further, the frame image and the four-color patch are simultaneously recorded by the camera 410 at the time of photographing and are then recorded onto the same recording medium. According, the amount of fading of the frame image and the amount of fading of the four-color patch are equal to each other.

Therefore, in the next step 320, correcting amounts are calculated such the faded four-color patch is respectively returned to the predetermined saturation and brightness, and the digital image data of the frame image is corrected by these correcting amounts (specifically, in steps 324 and 326 of FIG. 14). Thus, fading correction can be suitably made with respect to a frame image including both an amount of fading cause by the deterioration of the negative film N over time and an amount of fading caused by the deterioration of the photographic paper P overtime.

As the subroutines of FIGS. 11, 13 and 14 were explained in the first embodiment, explanation of these subroutines are omitted here.

In the above third embodiment, saturation and brightness information of the four-color patch recorded by the camera 410 are stored in the image recording device 10 in advance. However, when the saturation and brightness information of the four-color patch are not stored in the image recording device 10 in advance, these information may be recorded on the negative film N by the camera 410 and read by the image recording device 10.

The amount of fading of the negative film on which the four-color patch is written at the time of photographing may be corrected when each faded frame image is digitally read and exposed onto the photographic paper. This aspect corresponds to the invention of claim 4. In this aspect, as shown in FIG. 25, the respective frame images and four-color patches are read in a frame image reading-correcting processing (step 208) and the data is A/D-converted (step 211). Thereafter, the amount of fading is detected from the converted digital image data of the four-color patch, and a correcting amount is calculated (step 213). For example, the saturation of each of the cyan, magenta and yellow patterns is measured, and the difference between this measured saturation and the saturation at the time of initial setting is calculated so that a correcting amount of the saturation of each of the color components is deteremined. Further, the brightness of a gray pattern is measured, and the difference between this measured brightness and brightness at the time of initial setting is calculated so that a correcting amount of the brightness is determined.

The digital image data of a faded frame image is corrected on the basis of the above calculated correcting amounts of the saturations of the cyan, magenta and yellow color components and the above calculated correcting amount of the brightness. Thus, the corrected digital image data (corrected image data) is made (step 214) and is stored in the image memory 102 (step 216). Thus, the amount of fading of the negative film can be corrected.

Fourth Embodiment

A fourth embodiment of the present invention will next be explained. This fourth embodiment corresponds to the invention of claim 9. In an structure mode explained here, a four-color patch is recorded onto a negative film by a camera at a time of photographing. A print image is made by exposing an image and the four-color patch, which have faded and deteriorated to the same extent, onto the same photographic paper. On the basis of the amount of fading of the four-color patch among the image and the four-color patch which have faded and deteriorated to the same extent, the exposure conditions are corrected such that a fading correction amount of the image is provided.

In this fourth embodiment, four-color patch writing processing and the following two processings for forming color prints are sequentially executed. In the four-color patch writing processing, the four-color patch is written near each frame of the negative film by the camera 410 (see FIGS. 19 and 20) at the time of photographing. In a color print forming processing, color prints are formed by transmitting and exposing each frame image of the faded negative film onto a photographic paper by means of the printer 41 (see FIG. 15). In another color print forming processing, the an exposure conditions are corrected on the basis of a measured density value of the faded four-color patch by the printer 41, and a color print is made by newly exposing the image onto another photographic paper.

The four-color patch writing processing which is executed first is similar to that of the third embodiment. Therefore, explanation of this four-color patch writing processing is omitted here.

Next, the processing for forming color prints by transmitting and exposing each frame image of the faded negative film onto a photographic paper is executed in accordance with the processing routine of FIG. 16 which was explained in the second embodiment.

Finally, the correcting processing (see FIG. 23) of the exposure conditions on the basis of the measured density value of the faded four-color patch, and the exposure (making of the color print) processing (see FIG. 24) of an image on the basis of corrected exposure conditions are performed.

Figure 23:
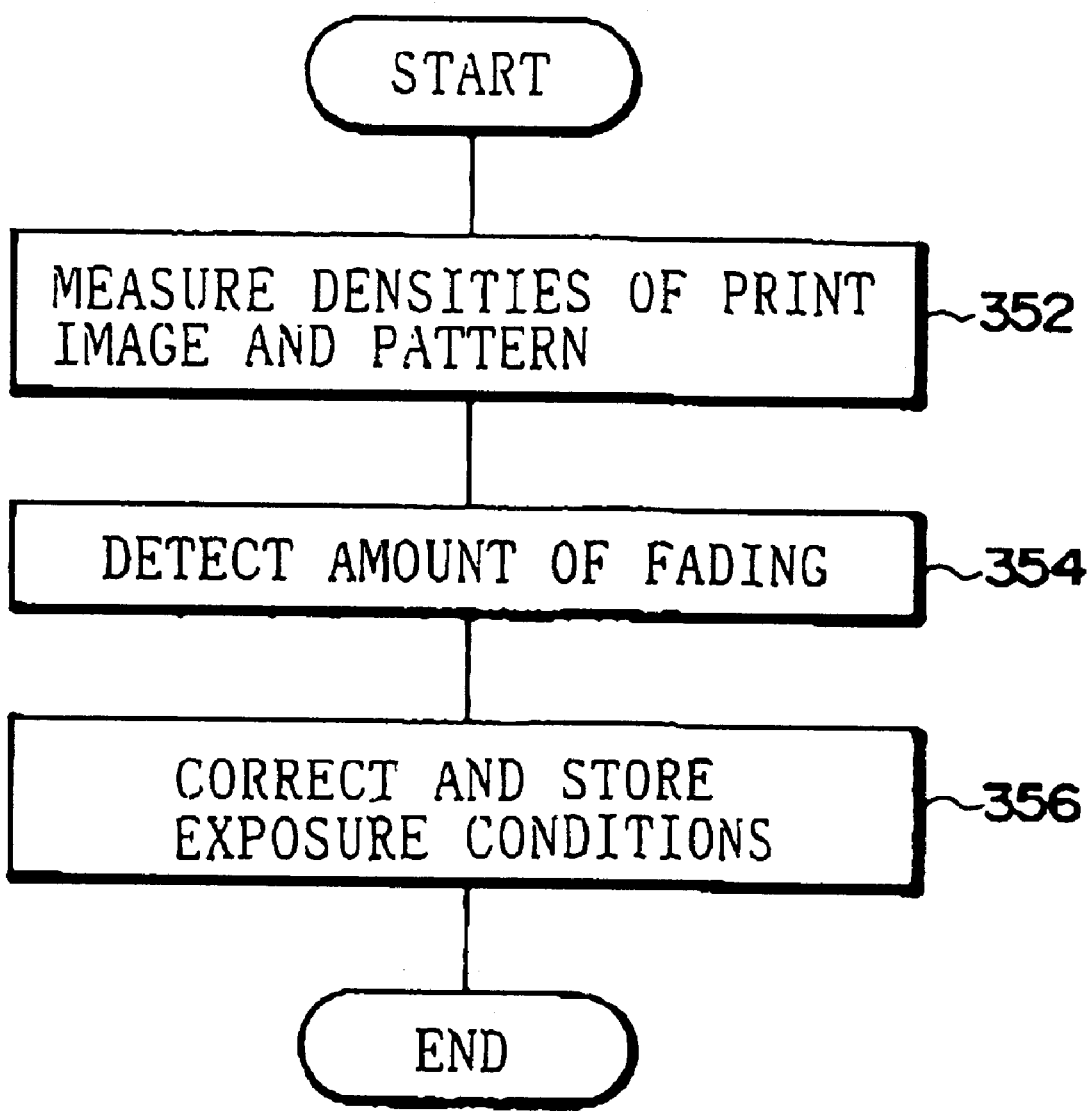
FIG. 23 is a flow chart showing a control routine of correction processing of exposure conditions based on a measured density value of a faded four-color patch in the fourth embodiment.

In step 352 of FIG. 23, the density of every color of each of the print image and the four-color patch is measured. In the next step 354, an amount of fading of every color is detected from the above measured density of every color of the four-color patch and a predetermined density of every color of the four-color patch. Here, the detected amount of fading of every color includes both an amount of fading caused by deterioration of the negative film N over time and an amount of fading caused by deterioration of the color paper P over time. Further, the frame image and the four-color patch are simultaneously recorded by the camera 410 at the time of photographing and are then recorded onto the same recording medium. Accordingly, the amount of fading of the frame image and the four-color patch are equal to each other.

Therefore, the exposure conditions are corrected in the next step 356 such that the detected amount of fading of every color is corrected, i.e., such that the density color of the faded four-color patch is returned to a predetermined density. The corrected exposure conditions are stored.

Figure 24:
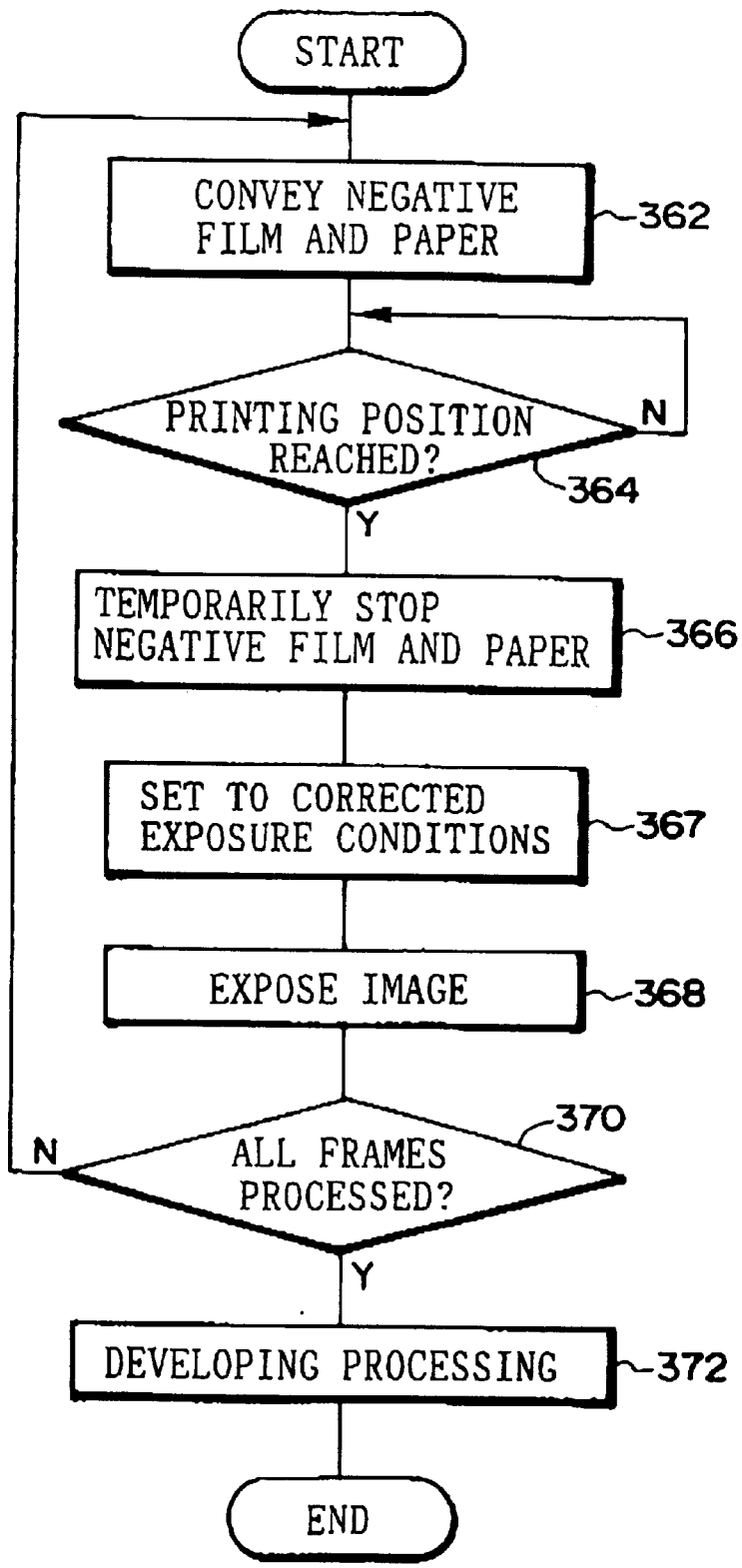
FIG. 24 is a flow chart shoving a control routine of exposure processing of an image based on corrected exposure conditions in the fourth embodiment.

Further, an image is exposed (a color print is formed) on the basis of the above corrected exposure conditions in accordance with the processing routine of FIG. 24. The processing routine of FIG. 24 is substantially similar to the color print making processing by transmission and exposure of the routine of FIG. 16. In step 367, the exposure conditions are set to the above corrected exposure conditions. In the next step 368, an image is exposed while insertion and withdrawal operations of the CC filter 45 are controlled by the CC filter driving section 43 of FIG. 15 on the basis of the corrected exposure conditions.

Thus, the image is exposed on the basis of the exposure conditions which are set such that both the amount of fading caused by the deterioration of the negative film N over time and the amount of fading caused by the deterioration of the photographic paper P over time are corrected. Accordingly, fading of the frame image can be suitably corrected.

The amount of discoloration of the negative film on which the four-color patch in written at the time of photographing may be corrected when each discolored frame image is transmitted and exposed onto the photographic paper. This aspect corresponds to the invention of claim 5. In this aspect, the density of the four-color patch of the faded negative film is measured and the exposure conditions are corrected on the basis of the measured density value. The image is exposed (a color print is made) on the basis of the corrected exposure conditions. Thus, the amount of fading of the negative film can be corrected.

Each of the patterns in the above first to fourth embodiments is formed by circular marks as shown in FIGS. 7A and 20. However, if the saturations and brightnesses of these patterns are respectively set to predetermined saturations and brightnesses, each of these patterns may be formed by a predetermined character or a predetermined bar code. If the pattern is formed by a character or a bar code, it is possible to obtain the further effect that various kinds of information, such as the exposure date, the exposure conditions, or the like can be recorded on the photograph print by the pattern.

As mentioned above, in accordance with the present invention, an image and a patterns are recorded on the same recording material (a negative or positive photosensitive material, or a photographic paper, or the like). Therefore, it is possible to compensate for the amount of decrease in saturation and the amount of decrease in brightness for each of the cyan, magenta and yellow colors by correcting the image on the basis of the amount of fading of the patterns. Accordingly, fading of the image can be suitably corrected.

In particular, in accordance with the eighth and ninth embodiments, the pattern is exposed onto the same negative or positive recording material as the image, and a print image is made by exposing the image and the pattern, which have faded and deteriorated to the same extent, onto the same second recording material (a photographic paper or the like). Digital image data or the exposure conditions are corrected such that a fading correction amount of the image is provided on the basis of the amount of fading of the pattern among the image and the pattern which have faded and deteriorated to the same extent. Accordingly, it is possible to carry out fading correction with respect to both an amount of fading deteriorating of the image recorded on the negative or positive recording material and an amount of fading deterioration of the image recorded on the second recording material.

Further, in accordance with the present invention, the image and the pattern are recorded on the same recording material. Accordingly, the amount of fading of the pattern and the amount of fading of the image can be considered equal to each other regardless of the storage conditions of this recording material. Therefore, the fading of the image can be suitably corrected on the basis of the amount of fading of the pattern.

Further, since the amount of fading is not judged by the visual sense of a person, no variation in accuracy of the fading correction is caused, and image quality can be stabilized a constant level.

What is claimed is:

1. An image recording method comprising the steps of:
   (a) exposing an image onto a negative or positive recording material, and exposing a pattern having a predetermined color and a predetermined density onto a region of the recording material outside a region on which the image is exposed;
   (b) developing the recording material on which the image and pattern have been exposed, and obtaining digital image data and digital pattern data by digitally reading, from the developed recording material, the image and the pattern which have faded and deteriorated over time;
   (c) carrying out fading correction of the digital image data on the basis of the color and the density of the pattern based on the obtained digital pattern data, and on the basis of the predetermined color and the predetermined density of the pattern; and
   (d) newly recording the image onto another recording material on the basis of the digital image data which has been subjected to fading correction.

2. The image exposing method according to claim 1, wherein in said step (a), the image and the pattern are simultaneously exposed.

3. The image exposing method according to claim 1, wherein in said step (a), the pattern is exposed before the image is exposed.

4. An image recording method comprising the steps of:
   (a) exposing an image onto a negative or positive recording material, and exposing a pattern having a predetermined color and a predetermined density onto a region of the recording material outside a region on which the image is exposed;
   (b) developing the recording material on which the image and the pattern have been exposed, and measuring, from the developed recording material, the density of each color of the pattern which has faded and deteriorated over time;
   (c) correcting an exposure condition for the image on the basis of the measured density of each color of the pattern and on the basis of the predetermined color and the predetermined density of the pattern; and
   (d) newly recording the image onto another recording material on the basis of the corrected exposure conditions.

5. The image exposing method according to claim 4, wherein, in said step (a), the image and the pattern are simultaneously exposed.

6. The image exposing method according to claim 4, wherein in said step (a), the pattern is exposed before the image is exposed.

7. An image recording method comprising the steps of:
   (a) when an image is recorded onto said recording material, recording, together with the image, a pattern having a predetermined color and a predetermined density onto a region of the recording material outside of the region on which the image is recorded;
   (b) obtaining digital image data and digital pattern data by digitally reading the recorded recording material which has faded and deteriorated over time;
   (c) carrying out fading correction of the digital image data on the basis of the color and the density of the pattern based on the obtained digital pattern data, and on the basis of the predetermined color and the predetermined density of the pattern; and
   (d) newly recording the image onto another recording material on the basis of the digital image data which has been subjected to fading correction.

8. An image recording method comprising the steps of:
   (a) when an image is exposed onto the recording material, exposing, together with the image, and a pattern having a predetermined color and a predetermined density onto a region of the recording material outside of the region on which the image is exposed;
   (b) measuring, from the exposed recording material, the density of each color of the pattern which has faded and deteriorated over time;
   (c) correcting exposure conditions for the image on the basis of the measured density of each color of the pattern and the predetermined color and the predetermined density of the pattern; and
   (d) newly exposing the image onto another recording material on the basis of the corrected exposure conditions.

9. An image recording method comprising the steps of:
   (a) exposing an image onto a negative or positive first recording material, and exposing a pattern having a predetermined color and a predetermined density onto a region of the first recording material outside of a region on which the image is recorded;
   (b) developing the exposed first recording material;
   (c) making a print image and a print pattern by printing, onto a second recording material, the image and the pattern of the developed first recording material which have faded and deteriorated over time, and obtaining digital image data and digital pattern data by digitally reading the print image and the print pattern which have faded and deteriorated over time;
   (d) carrying out fading correction for the digital image data on the basis of the color and the density of the pattern based on the obtained digital pattern data, and on the basis of the predetermined color and the predetermined density of the pattern; and
   (e) newly recording the image onto a third recording material on the basis of the digital image data which has been subjected to fading correction.

10. The image exposing method according to claim 9, wherein in said step (a), the image and the pattern are simultaneously exposed.

11. An image recording method comprising the steps of:
    (a) exposing an image onto a negative or positive first recording material, and exposing a pattern having a predetermined color and a predetermined density onto a region of the first recording material outside of a region on which the image is exposed;

(b) developing the exposed first recording material;

(c) making a print image and a print pattern by exposing, onto a second recording material, the image and the pattern of the developed first recording material which have faded and deteriorated over time;

(d) measuring the density of each color of the print pattern which has faded and deteriorated over time;

(e) corrected exposure conditions for the image on the basis of the measured density of each color of the pattern and the predetermined color and the predetermined density of the pattern; and (f) newly exposing the image onto a third recording material on the basis of the corrected exposure conditions.

12. The image exposing method according to claim 11, wherein in said step (a), the image and the pattern are simultaneously exposed.

13. A recording material on which an image is recorded, wherein at least one pattern is recorded onto a region of the recording material outside of a region at which the image is recorded, said at least one pattern being at least one of:

a pattern which color is cyan having a predetermined density thereof, a pattern which color is yellow having a predetermined density thereof and a pattern which color is magenta having a predetermined density thereof; and a pattern which color is gray, formed by cyan, magenta and yellow, having a predetermined density thereof;

wherein said at least one pattern is recorded onto the recording material before the image is recorded on the recording material.

14. The recording material according to claim 13, wherein said at least one pattern and the image are developed at the same time.

15. The recording material according to claim 13, wherein the recording material is a printing paper.

16. A recording material on which an image is recorded, wherein at least one pattern is recorded onto a region of the recording material outside of a region at which the image is recorded, said at least one pattern being at least one of:

a pattern which color is cyan having a predetermined density thereof, a pattern which color is yellow having a predetermined density thereof and a pattern which color is magenta having a predetermined density thereof; and a pattern which color is gray, formed by cyan, magenta and yellow, having a predetermined density thereof, wherein said at least one pattern is recorded onto the region of the recording material outside of a region at which the image is recorded at the same time that the image is recorded on the recording material.

17. The recording material according to claim 16, wherein the recording material is a printing paper, and said at least one pattern is recording onto the printing paper at the same time the image is recorded on the printing paper.

18. A recording material on which an image is recorded, wherein at least one patter is recorded onto a region of the recording material outside of a region at which the image is recorded, said at least one pattern being at least one of:

a pattern which color is cyan having a predetermined density thereof, a pattern which color is yellow having a predetermined density thereof and a pattern which color is magenta having a predetermined density thereof; and a pattern which color is gray, formed by cyan, magenta and yellow, having a predetermined density thereof, wherein the recording material is a film, and said at least one pattern is exposed onto the film before developing the film.

* * * * *